(12) United States Patent
Sato et al.

(10) Patent No.: US 7,849,258 B2
(45) Date of Patent: Dec. 7, 2010

(54) STORAGE APPARATUS AND DATA VERIFICATION METHOD FOR THE SAME

(75) Inventors: Kei Sato, Chigasaki (JP); Hisaharu Takeuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 11/970,839

(22) Filed: Jan. 8, 2008

(65) Prior Publication Data

US 2009/0067081 A1    Mar. 12, 2009

(30) Foreign Application Priority Data

Sep. 7, 2007   (JP) .............................. 2007-233414

(51) Int. Cl.
*G06F 12/00* (2006.01)

(52) U.S. Cl. ...................... 711/112; 711/164; 711/109; 711/E12.001; 717/174

(58) Field of Classification Search ........................ None
See application file for complete search history.

(56) References Cited

U.S. PATENT DOCUMENTS 4,559,568 A  12/1985  Watanabe et al.
2004/0210712 A1  10/2004  Katsuragi et al.
2005/0091540 A1*  4/2005  Dick et al. ................... 713/201
2006/0294299 A1*  12/2006  Edirisooriya ................. 711/112
2007/0055797 A1  3/2007  Shimozono

FOREIGN PATENT DOCUMENTS

JP  58-125205  7/1983
JP  2004-318485  11/2004
JP  2007-072571  3/2007

\* cited by examiner

*Primary Examiner*—Reginald G Bragdon
*Assistant Examiner*—Arvind Talukdar
(74) *Attorney, Agent, or Firm*—Brundidge & Stanger, P.C.

(57) ABSTRACT

A controller unit for the storage apparatus executes the following: giving each data block, which is a data constituent unit, an identification number indicating that the relevant data has been sent from a host computer in response to an arbitrary write request from the host computer; storing, in a memory unit, a storage location in a hard disk drive unit to store the data, as well as the identification number, as an expected value, for the data to be stored in the hard disk drive unit; and in response to a read request from the host computer, comparing the identification number given to each data block, the constituent unit of the data read from the hard disk drive unit, with the expected value of the read data, thereby verifying that the read data is the data written to the hard disk drive in response to the arbitrary write request.

6 Claims, 23 Drawing Sheets

POSITION CODE:
10 TOP BLOCK
00 MIDDLE BLOCK
01 LAST BLOCK

WRITE SEQUENCE NUMBERING

| BLOCK ADDRESS (110A) | WRITE SEQUENCE NUMBER (110B) |
|---|---|
| 0 | 10-AAAAAA |
| 1 | 00-AAAAAA |
| 2 | 00-AAAAAA |
| ⋮ | ⋮ |
| 4094 | 00-AAAAAA |
| 4095 | 01-AAAAAA |
| 4096 | 10-BBBBBB |
| ⋮ | ⋮ |
| 8191 | 01-BBBBBB |
| 8192 | 10-CCCCCC |
| ⋮ | ⋮ |
| 12287 | 01-CCCCCC |
| P0 | 10-A∼C |
| P1 | 00-A∼C |
| ⋮ | ⋮ |
| P4095 | 01-A∼C |
| ⋮ | ⋮ |

| BLOCK ADDRESS (900A) | WRITE SEQUENCE NUMBER (900B) |
|---|---|
| ⋮ | ⋮ |
| 10 | 10-AAAAAA |
| 11 | 00-AAAAAA |
| 12 | 01-AAAAAA |
| 13 | 00-BBBBBB |
| 14 | 00-BBBBBB |
| ⋮ | ⋮ |

WRITE SEQUENCE NUMBER INFORMATION a (rows 10, 11, 12)
WRITE SEQUENCE NUMBER INFORMATION b (rows 13, 14)

| BLOCK ADDRESS (700A) | GENERATION NUMBER (700B) |
|---|---|
| ⋮ | ⋮ |
| 10 | 100 |
| 11 | 200 |
| ⋮ | ⋮ |

| POSITION CODE | CHECK ON | CHECK OFF |
|---|---|---|
| 10 | CHECK THE NEXT LOOP | CHECK ON |
| 00 | CHECK IF THE PREVIOUS DATA BLOCK CORRESPONDS TO SEQ# OR NOT | CHECK ON |
| 01 | CHECK IF THE PREVIOUS DATA BLOCK CORRESPONDS TO SEQ# OR NOT | |

104C / 104D / 104E

104

STORAGE APPARATUS AND DATA VERIFICATION METHOD FOR THE SAME

CROSS-REFERENCES TO RELATED APPLICATIONS

This application relates to and claims priority from Japanese Patent Application No. 2007-233414, filed on Sep. 7, 2007, the entire disclosure of which is incorporated herein by reference.

BACKGROUND

1. Field of the Invention

The present invention relates to a storage apparatus and its data verification method. The invention is suited for application in a storage apparatus for verifying data recorded on hard disk drives.

2. Description of Related Art

In recent years, as the information society has progressed, the amount of data from a host computer to be stored in storage apparatuses has been rapidly increasing. As a result of this situation, expansion in scale of the storage capacity of storage apparatuses is being promoted. An attempt has been made to expand the scale of the storage capacity of storage apparatuses by operating the storage apparatuses according to the RAID (Redundant Array of Independent/Inexpensive Disks) system, where one or more logical volumes (hereinafter referred to as "logical volumes") are formed into storage areas provided by one or more hard disk drives.

There are various methods for detecting errors in data recorded on the hard disk drives described above.

First, there is the detection method called "block address check," involving the steps of: when writing data, adding a block address in a logical volume (Logical Address) to the data; and when reading the data from a hard disk drive, checking the block address added to the data, and the actually read block address. This detection method enables detection of a position error for the data written to the relevant block addresses.

There is another detection method called LRC (Longitudinal Redundancy Check), involving the steps of calculating, for each data block DB, the exclusive disjunction of bit string data sent from a host computer and adding the result of the exclusive disjunction to each data block DB. This detection method enables detection of a bit error in the data blocks DB by adding a parity bit value to each data block DB.

Also, Japanese Patent Laid-Open (Kokai) Publication No. 2007-72571 discloses a method for detecting incomplete data writing by adding a unique value to data upon each write request and verifying the data based on the unique value when reading the data.

Furthermore, Japanese Patent Laid-Open (Kokai) Publication No. S58-125205 discloses a method for detecting a data error in data blocks DB by adding a unique value for data differentiation to data upon each write request and verifying the unique value when reading the data.

However, in the detection methods described above, if the hard disk drive fails to receive an actual write request, the old, non-updated data stored in the hard disk drive is detected and errors in that data are verified instead. Accordingly, any fault in receiving the write request itself cannot be detected.

SUMMARY

The present invention was devised in consideration of the above circumstances. It is an object of the invention to suggest a storage apparatus and data verification method for detecting a fault in a hard disk drive failing to receive an actual write request and therefore failing to record all relevant data on the hard disk drive.

In order to achieve the above-described object, provided according to an aspect of the invention is a storage apparatus including: a controller unit that has a memory unit for temporarily storing data sent from a host computer in response to an arbitrary write request from the host computer and controls input and output of the data; and a hard disk drive unit that is connected to the controller unit and stores the data; wherein the controller unit performs the following: giving each data block, which is a data constituent unit, an identification number indicating that the relevant data has been sent from the host computer in response to the arbitrary write request from the host computer; storing, in the memory unit, a storage location in the hard disk drive unit to store the data, as well as the identification number, as an expected value, for the data to be stored in the hard disk drive unit; and in response to a read request from the host computer, comparing the identification number given to each data block, the constituent unit of the data read from the hard disk drive unit, with the expected value of the read data, thereby verifying that the read data read is the data that was written to the hard disk drive in response to the arbitrary write request.

As a result, whether or not the read data is the data written to the hard disk drive in response to an arbitrary write request is verified. Therefore, it is possible to verify whether or not the hard disk drive successfully received the arbitrary write request.

According to another aspect of the invention, provided is a data verification method for a storage apparatus including a controller unit that has a memory unit for temporarily storing data sent from a host computer in response to an arbitrary write request from the host computer and controls input and output of the data; and a hard disk drive unit that is connected to the controller unit and stores the data; wherein the data verification method includes the steps executed by the controller unit of: giving each data block, which is a data constituent unit, an identification number indicating that the relevant data has been sent from the host computer in response to the arbitrary write request from the host computer; storing, in the memory unit, a storage location in the hard disk drive unit to store the data, as well as the identification number, as an expected value, for the data to be stored in the hard disk drive unit; and in response to a read request from the host computer, comparing the identification number given to each data block, the constituent unit of the data read from the hard disk drive unit, with the expected value of the read data, thereby verifying that the read data is the data that was written to the hard disk drive in response to the arbitrary write request.

As a result, whether or not the read data is the data written to the hard disk drive in response to an arbitrary write request is verified. Therefore, it is possible to verify whether or not the hard disk drive successfully received the arbitrary write request.

Even if the hard disk drive fails to receive a write request, the present invention can detect the fault in receiving the write request itself without detecting the old, non-updated data stored in the hard disk drive and verifying errors in that data. Therefore, the data sent from the host computer can be guaranteed as the most recent and error-free.

Other aspects and advantages of the invention will be apparent from the following description and the appended claims.

BRIEF DESCRIPTION OF THE DRAWINGS

FIG. 9 shows the write sequence number table according to the first embodiment.

FIG. 10 shows a generation number management table according to the first embodiment.

FIG. 11 shows a check table according to the first embodiment.

DETAILED DESCRIPTION OF PREFERRED EMBODIMENTS (1) First Embodiment (1-1) Configuration of Storage System FIG. 1 is a conceptual diagram of the entire storage system according to the present invention.

Figure 1:
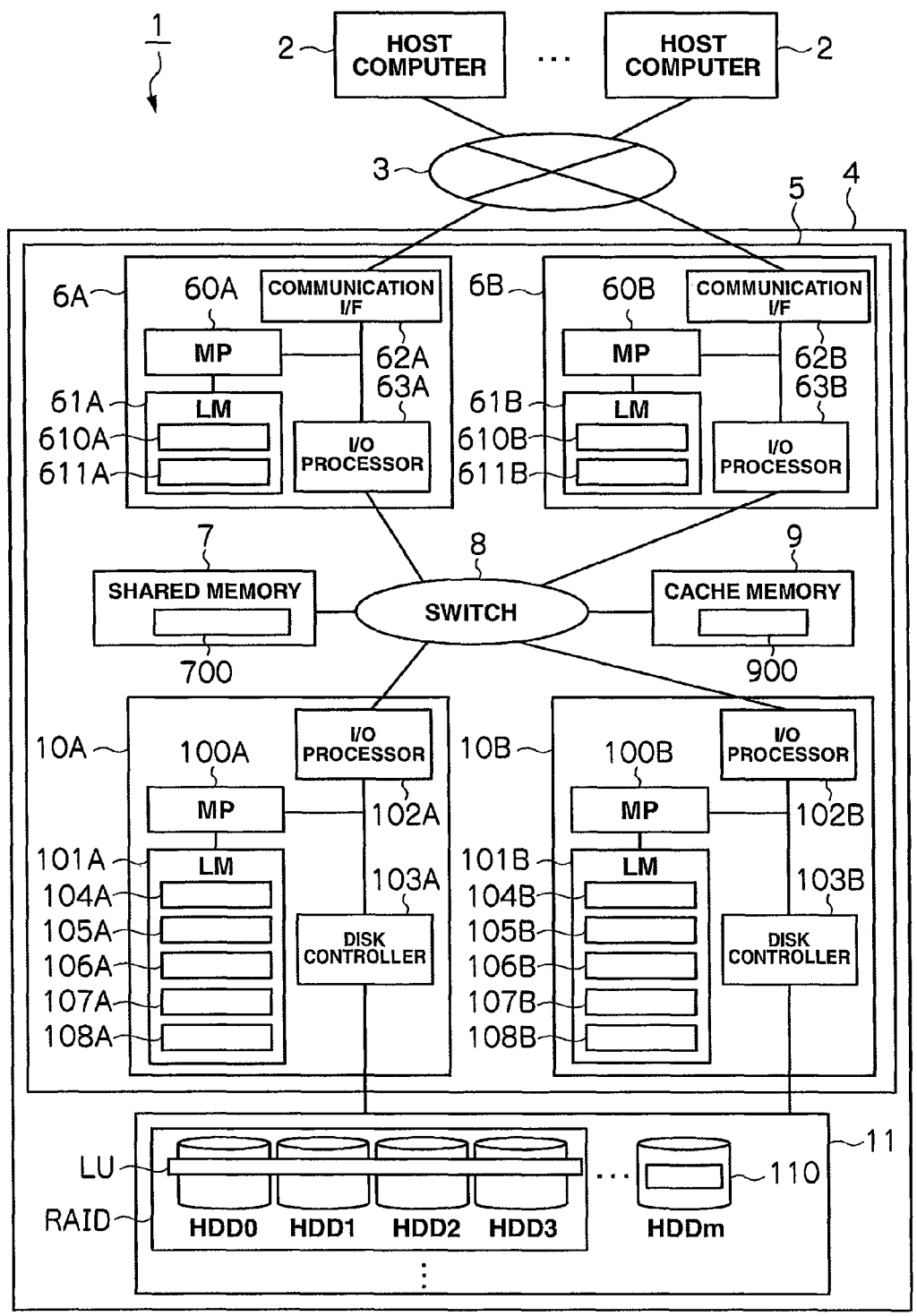
FIG. 1 is a block diagram of the entire storage system according to a first embodiment of the present invention.

Reference numeral "1" represents a storage system according to the present invention. The storage system 1 according to the invention is configured so that host computers 2 are connected via a network 3 to a storage apparatus 4.

The host computer 2 is a computer system equipped with information processing resources such as a CPU (Central Processing Unit) and memory. The host computer 2 includes information input devices (not shown in the drawing) such as a keyboard, a switch, a pointing device, and/or a microphone; and information output devices (not shown in the drawing) such as a monitor display and/or speakers.

The network 3 is composed of, for example, a SAN (Storage Area Network), a LAN (Local Area Network), the Internet, public line(s), or private line(s). Communication between the host computer 2 and the storage apparatus 4 via the network 3 is conducted according to Fibre Channel Protocol (FCP) when the network 3 is a SAN, or according to Transmission Control Protocol/Internet Protocol (TCP/IP) when the network 3 is a LAN.

The storage apparatus 4 includes a controller unit 5 for controlling data input and output by the host computer 2, and a hard disk drive unit 11 for storing data from the host computer 2.

The controller unit 5 is configured so that channel adapters 6, shared memory 7, cache memory 9, and disk adapters 10 are connected to each other via a switch 8. Data and commands are sent and received between the channel adapters 6, the shared memory 7, the cache memory 9, and the disk adapters 10 via, for example, a bus or a switch like a very high speed crossbar switch for transmitting data by means of high-speed switching.

Each channel adapter 6 is configured as a microcomputer system equipped with, for example, a microprocessor 60, local memory 61 (that stores a write sequence number table 610 and a generation number management table 611 described later), a communication interface 62, and an I/O processor 63, and has a port (not shown in the drawing) for connection to the network 3. The channel adapter 6 interprets various commands sent from the host computer 2 and executes the required processing. The each channel adapter 6 port is given a network address (such as an Internet Protocol [IP] address or a World Wide Name [WWN]) to identify itself. Accordingly, each channel adapter 6A, 6B can individually act as NAS (Network Attached Storage). Unless indicated otherwise in this embodiment, the channel adapters 6A, 6B are indicated as channel adapter 6; and reference characters "A" and "B" are not mentioned also regarding the above-described internal configuration of the channel adapter unless indicated otherwise.

The shared memory 7 is storage memory shared by the channel adapters 6 and the disk adapters 10. The shared memory 7 is mainly used to store system configuration information and various control programs that are read from system volumes when the power for the storage apparatus 4 is turned on, as well as commands from the host computer 2. The shared memory 7 also stores a generation number management table 700 described later.

The cache memory 9 is also storage memory shared by the channel adapters 6 and the disk adapters 10. This cache memory 9 is mainly used to temporarily store user data input to or output from the storage apparatus 4. The cache memory 9 stores a write sequence number table 900 described later.

Each disk adapter 10 is configured as a microcomputer system equipped with a microprocessor 100, memory 101, an I/O processor 102, and a disk controller 103, and functions as an interface for controlling protocol when communicating with the hard disk drive unit 11. Each disk adapter 10A, 10B is connected to the hard disk drive unit 11 via, for example, a Fibre Channel cable, and sends/receives data to/from the hard disk drive unit 11 according to Fibre Channel Protocol. Unless indicated otherwise in this embodiment, the disk adapters 10A, 10B are indicated as the disk adapter 10; and reference characters "A" and "B" are not mentioned also regarding the above-described internal configuration of the disk adapter unless indicated otherwise.

The memory 101 for the disk adapter 10 stores a check table 104 (described later), a write sequence number saving program 105, a write sequence number check program 106, a write sequence number table 107, and a generation number management table 108.

The hard disk drive unit 11 is composed of a plurality of hard disk drives HDD, for example, expensive hard disk drives like SCSI (Small Computer System Interface) disks, or inexpensive hard disk drives like SATA (Serial AT Attachment) disks.

These hard disk drives HDD constitute a RAID group. In this embodiment, the hard disk drives HDD are operated according to the RAID 5 system. A hard disk drive HDDm among the hard disk drives HDD stores a write sequence table 110 (described later).

One or more logical volumes LU are defined in physical storage areas provided by these hard disk drives HDD. Data from the host computer 2 is written in blocks of predetermined size to the logical volumes LU and data in the logical volumes LU is read in blocks of predetermined size by the host computer 2.

Each logical volume LU is given its own unique identifier (LUN: Logical Unit Number). In this embodiment, user data input and output is conducted by designating, as an address, a combination of the above-mentioned identifier and a unique block number (LBA: Logical Block Address) assigned to each block.

(1-2) Tables (1-2-1) Write Sequence Table

First, the data configuration according to this embodiment will be explained before explaining a write sequence table 110.

Data is configured according to the first embodiment so that data sent upon a write request from the host computer 2 is divided. Data division is performed according to the RAID level of the storage system 1. Since the storage system 1 according to the first embodiment employs a RAID 5 operation system, data is divided and stored in, for example, any three of four hard disk drives HDD0 to HDD3 (for example, in HDD0 to HDD2) and parity data P is stored in the remaining hard disk drive (for example, HDD3). Therefore, data sent in response to one write request is divided into three parts according to the first embodiment. In the storage system 1 according to the first embodiment, the parity data P is distributed and stored in the hard disk drives HDD.

Figure 2:
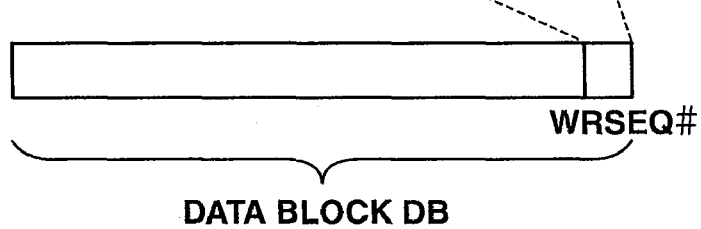
FIG. 2 is an explanatory diagram of a data block according to the first embodiment.

As shown in FIG. 2, the divided data (hereinafter referred to as the "divided data") is further divided into data blocks DB that are minimum data units.

Regarding a plurality of data blocks DB, a write sequence number WRSEQ# (indicated in the abbreviated form WRSEQ# in the drawings) is given to each data block DB. The write sequence number WRSEQ# is an identification number to be given as a guarantee code for the divided data and consists of a position code R and a sequence number that is an identifier (indicated in the abbreviated form SEQ# in the drawings).

The position code R is the code that indicates where the relevant data block DB is located in a data block group to be written upon one write request. If the relevant data block DB is the top data block DB in the data, the number "10," indicating the top block, is given to the data block DB as the position code R. If the relevant data block DB is a middle data block DB, the number "00," indicating a middle block, is given to the data block DB as the position code R. If the relevant data block DB is the last the data block DB, the number "01," indicating the middle block, is given to the data block DB as the position code R.

The sequence number SEQ# is a unique value given upon each write request from the host computer 2 and is an identification number for verifying whether data was written to the hard disk drive in response to an arbitrary write request. A data block group sent in response to one write request is given the same value as the sequence number SEQ#, the identification number.

Figure 3:
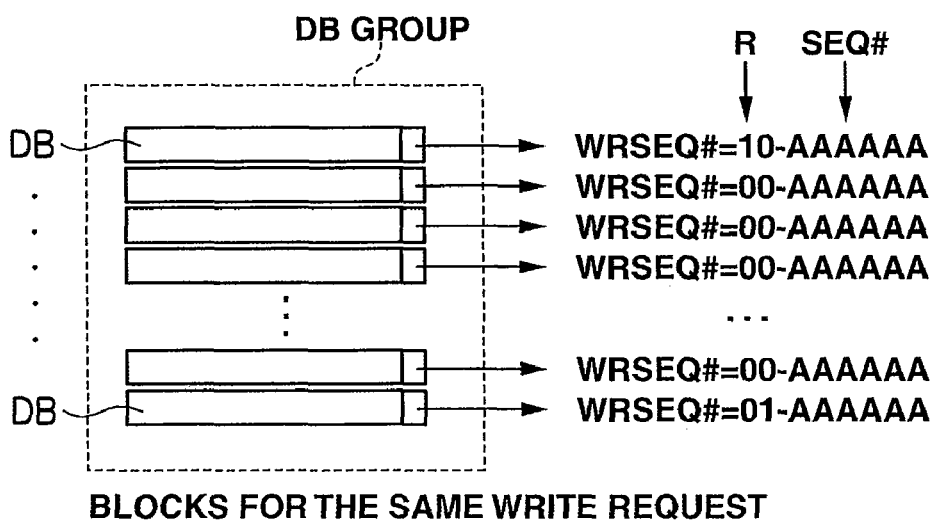
FIG. 3 is an explanatory diagram of a write sequence number according to the first embodiment.

For example, the data block group is configured as shown in FIG. 3 so that the position code R and the sequence number SEQ# (for example, "AAAAAA") are given as the write sequence number WRSEQ# to each data block DB. It can be understood that the data block group having the same sequence number SEQ# "AAAAAA" is the data sent in response to one write request.

Figure 4:
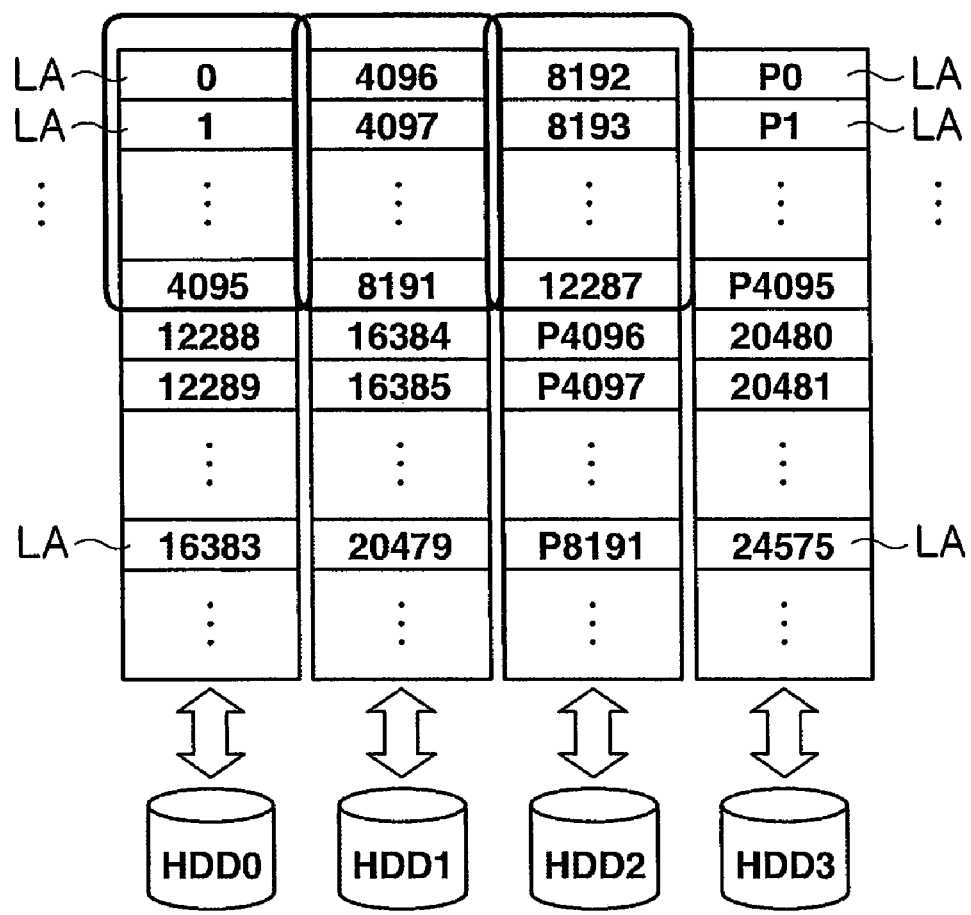
FIG. 4 is an explanatory diagram showing how to create a write sequence number table according to the first embodiment.

Then, as shown in FIG. 4, the data blocks with the sequence number SEQ# are written to block addresses assigned to each hard disk drive HDD. The write sequence number SEQ# is also given to each data block for the parity data P.

Figure 5:
FIG. 5 shows the write sequence number table according to the first embodiment.

FIG. 5 shows a write sequence table 110.

As explained with reference to FIG. 4, the write sequence table 110 is a table that stores the correspondence relationship between block addresses (logical address) LA assigned to the hard disk drives HDD and the write sequence numbers WRSEQ# given to the data blocks DB written to the block addresses.

The write sequence table 110 consists of a "block address" field 110A and a "write sequence number WRSEQ#" field 110B, and shows the write sequence number WRSEQ# of a data block DB stored at a block address LA in the hard disk drive HDD.

For example, assuming that one data block DB is 512 bytes and one write sequence number WRSEQ# is 1 byte and the capacity of one hard disk drive HDD is 146 gigabytes, one hard disk drive HDD is required to use the capacity of 285 megabytes for the write sequence numbers WRSEQ#. It is difficult to store such an enormous amount of write sequence numbers WRSEQ# in the local memory 61 for the channel adapter 6 or in the local memory 101 for the disk adapter 10. Therefore, the write sequence table 110 is stored in the hard disk drives HDD. A special hard disk drive HDDm for storing this write sequence table 110 may be provided or a special storage area for storing the write sequence table 110 may be provided in each hard disk drive HDD.

However, if the write sequence table 110 is stored in the hard disk drive(s) HDD, and if some data needs to be read frequently, the hard disk drive(s) HDD has to be accessed every time. Therefore, the storage system 1 according to the first embodiment employs a hierarchical memory control system in order to avoid degradation of access performance of the storage system 1.

Figure 6:
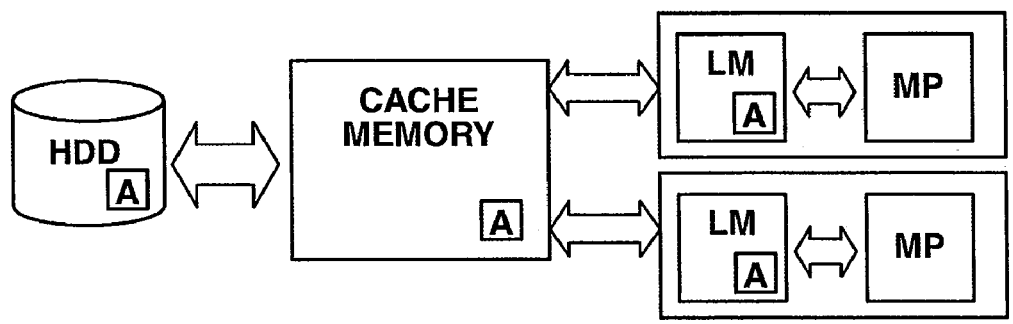
FIG. 6 is an explanatory diagram of a hierarchical memory control system according to the first embodiment.

As shown in FIG. 6, the hierarchical memory control system is a control system for hierarchically storing write sequence number information A (hereinafter referred to as "write sequence number information A") that is information about write sequence number tables 900, 610, and 107 (described later) out of the information about the data block groups sent and received by the host computer 2, in the storage apparatus 4, i.e., not only in the hard disk drives HDD, but also in the cache memory 9, and in the local memory 61 for the channel adapter 6 or in the local memory 101 for the disk adapter 10. The write sequence number information A is part of the information about the data block groups in the write sequence table 110, and that part of the information is stored as information for the write sequence number tables 900, 610, 107 in the cache memory 9 and in the local memory 61 for the channel adapter 6 or the local memory 101 for the disk adapter 10. The hierarchical memory control system executes data read/write processing (described later) by storing the write sequence number information A, which the host computer 2 needs frequently, from among the data block groups sent and received by the hard disk drives HDD, in the cache memory 9 or the local memory 61, 101. The speed to read and write the write sequence numbers from and to the hard disk drives HDD can be improved by employing the hierarchical memory control system.

Figure 7:
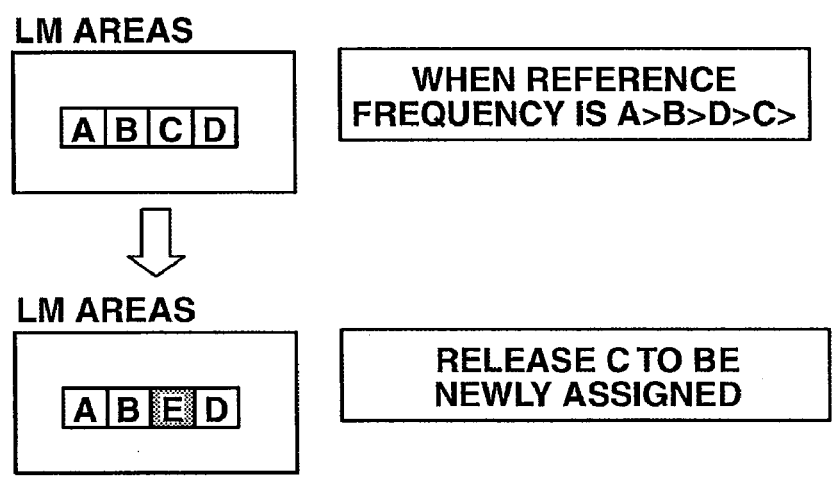
FIG. 7 is an explanatory diagram explaining local memory areas, using the hierarchical memory control system according to the first embodiment.

Also as shown in FIG. 7, in the hierarchical memory control system, the microprocessors 60, 100 manage data stored in the local memory 61, 101 by dividing physical areas in the local memory 61, 101 into pages (hereinafter referred to as the "page areas"). The microprocessors 60, 100 manage the frequency of reference to areas A to D in the local memory 61, 101, release the lowest frequency area C, and assign that area as a new area E. Incidentally, the cache memory 9 manages data stored in the memory by dividing physical areas in the memory into blocks (hereinafter referred to as the "block areas").

(1-2-2) Write Sequence Number Table

The write sequence number tables 900, 610, 107 stored in the cache memory 9, the local memory 61 for the channel adapter 6, and the local memory 101 for the disk adapter 10 respectively will be explained below. This section will describe the write sequence number table 900 stored in the cache memory 9. Since the write sequence number tables 610, 107 stored in the local memory 61 for the channel adapter 6 and in the local memory 101 for the disk adapter 10 are configured in the same manner as the write sequence number table 900, the description of the write sequence number tables 610, 107 have been omitted.

Figure 8:
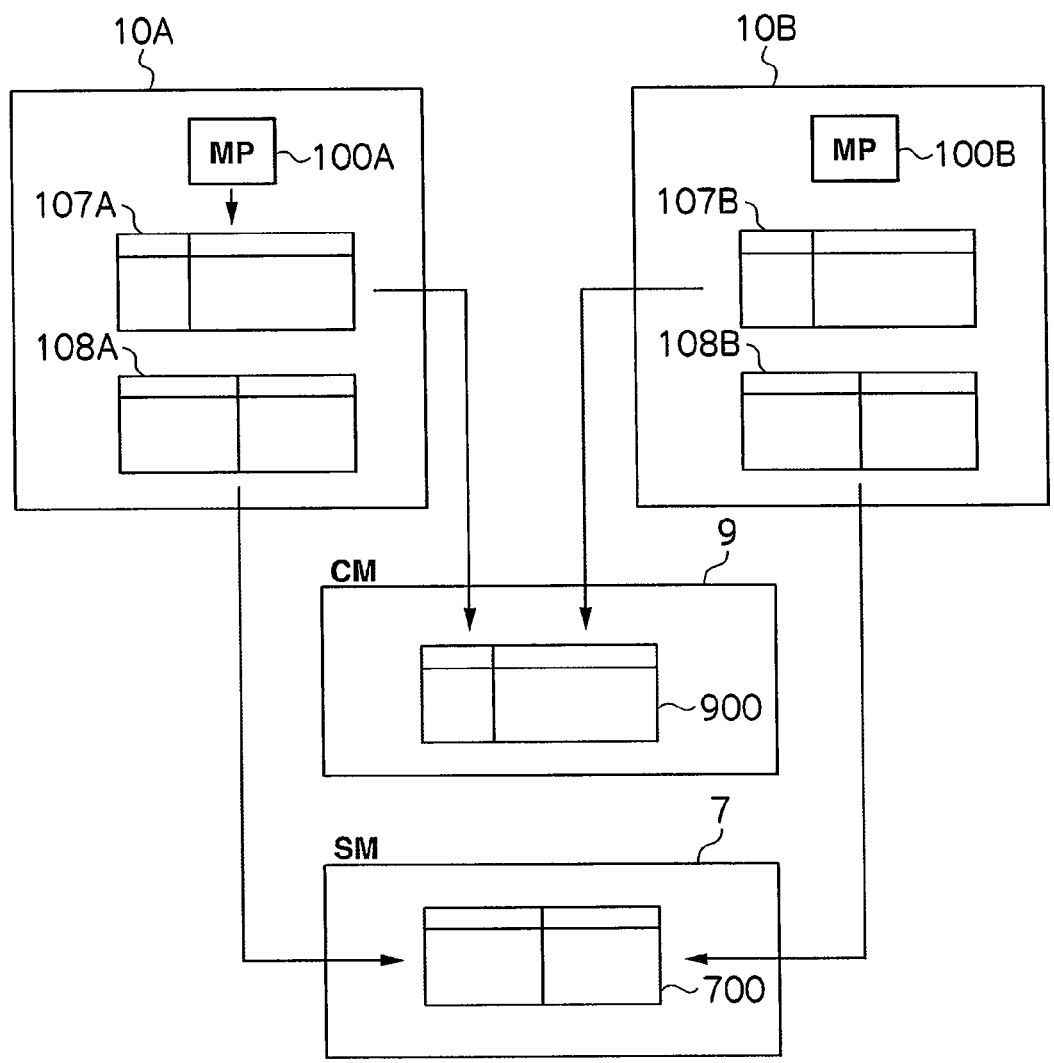
FIG. 8 shows the content of various memory units according to the first embodiment.

As shown in FIG. 8, the disk adapters 10 have a plurality of microprocessors 100A, 100B. These microprocessors 100A, 100B individually refer to the write sequence number information A in their own local memory 101A, 101B and update all or some of the data block groups. The write sequence number information A updated individually by the microprocessors 100A, 100B is reflected in the cache memory 9 every time the update is performed.

The cache memory 9 reflects the update information of the write sequence number information A sent individually from the microprocessors 100A, 100B by storing the write sequence number information A in areas of the cache memory 9. Updates of the write sequence number information A are managed in the shared memory 7, using the generation number. The microprocessors 100A, 100B do not mutually update the write sequence number information A. As a result, the information about the most recent write sequence number information A is managed by the cache memory 9, and the generation number information about the most recent write sequence number information A is managed by the shared memory 7. The larger the generation number becomes, the larger number of times the write sequence number information A is updated.

The write sequence number table 900, 610, 107 shown in FIG. 9 is a table from and to which data is frequently read and written, that manages only the write sequence numbers separately from the data block groups DB, and that stores the write sequence number information A, which is part of the information in the write sequence table 110 stored in the hard disk drives HDD. The write sequence number table 900, 610, 107 consists of a "block address" field 900A and a "write sequence number WRSEQ#" field 900B. The respective fields are the same as those in the write sequence table 110, so their description has been omitted here. The write sequence number information a and the write sequence number information b in FIG. 9 represent the write sequence number information A explained above with reference to the hierarchical memory control system.

(1-2-3) Generation Number Management Table

Generation number management tables 610, 700, 108, stored respectively in the local memory 61 for the channel adapter 6, the local memory 101 for the disk adapter 10, and the shared memory 7 will be described below.

FIG. 10 shows the generation number management table 700 stored in the shared memory 7. Since the generation number management tables 610, 108 stored in the local memory 61, 101 are configured in the same manner as the generation number management table 700, their description has been omitted here.

The generation number management table 700 is a table that manages the generation number of the most recent write sequence number information A, and consists of a "block address" field 700A and a "generation number" field 700B. The "block address" field 700A stores the block address in the hard disk drive HDD, and the "generation number" field 700B stores the generation number indicating the number of times the write sequence number information A has been updated.

(1-2-4) Check Table

A check table 104 shown in FIG. 11 is a table used to verify the consistency in the sequence numbers SEQ# given to the adjacent data block groups when data is read from the storage apparatus 4 and sent to the host computer 2.

The check table 104 consists of a "position code" field 104C indicating the position code R of a data block DB; a "check-on" field 104D for verifying the consistency of the sequence number SEQ# given to the data block DB to be verified; and a "check-off" field 104E. The expression "check" used herein means verification of the consistency of the sequence number SEQ# given to the data block DB to be verified.

If the check is on for, for example, data blocks DB with the position codes R "00" and "01," it means that the consistency of the sequence number SEQ# with the previous data block DB is to be checked. However, in the case of a data block DB with the position code R "10," it is the top block and, therefore, it is unnecessary to verify the consistency of the sequence number SEQ# with the previous data block DB. Accordingly, if the check is on for a data block DB with the position code R "10," it means that the sequence number SEQ# of the next data block DB is to be verified.

If the check is off for the data blocks DB with the position codes R "10" and "00," it means the check needs to be turned on. However, if the check is off for the data block DB with the position code R "01," since it is the data block DB with which one sequence ends, it is unnecessary to turn the check on.

(1-3) Writing Data (1-3-1) Write Sequence Numbering Processing

Write sequence numbering processing for writing data, using the aforementioned hierarchical memory control system, to a hard disk drive HDD will be described below. The write sequence numbering processing is executed by the microprocessor 100 for the disk adapter 10 in accordance with a write program (not shown in the drawing) stored in the memory 101.

Since the write sequence numbering processing is executed when writing data, data write processing will be explained first.

Upon receiving a write request from the host computer 2, the channel adapter 6 starts the data write processing. Then, after receiving the relevant data from the host computer 2, the channel adapter 6 writes the data in block areas created by dividing the area in the cache memory 9 into blocks.

Subsequently, the channel adapter 6 notifies the host computer 2 of the completion of data writing. After detecting the data written to the bock areas in the cache memory 9, the disk adapter 10 reads the written data from the cache memory 9 and writes that data to the hard disk drive HDD. When writing the data to the hard disk drive HDD, the disk adapter 10 gives the write sequence number WRSEQ# to the relevant data blocks. When this happens, the disk adapter 10 records the block addresses and the generation number of the data in the shared memory 7.

Figure 12:
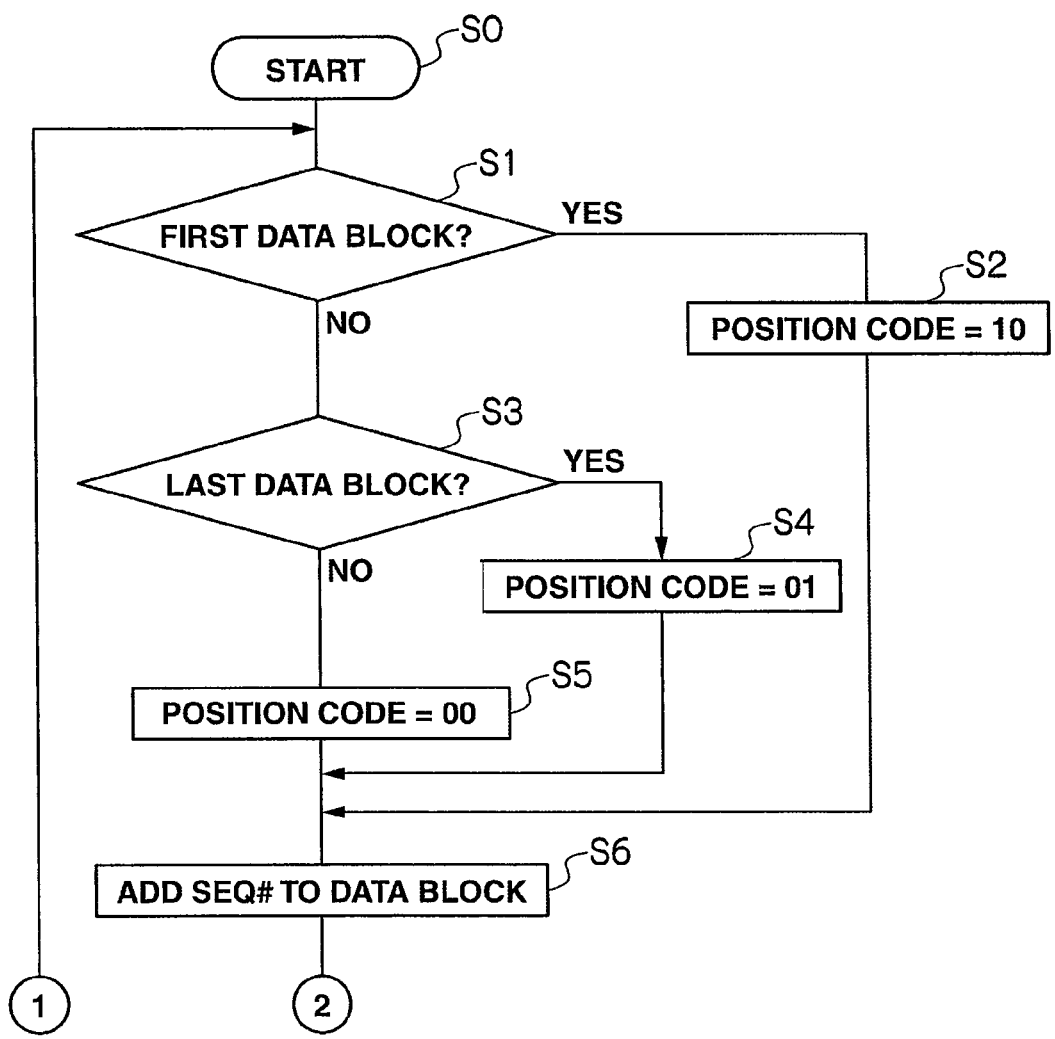
FIG. 12 is a flowchart illustrating write sequence numbering processing according to the first embodiment.
Figure 13:
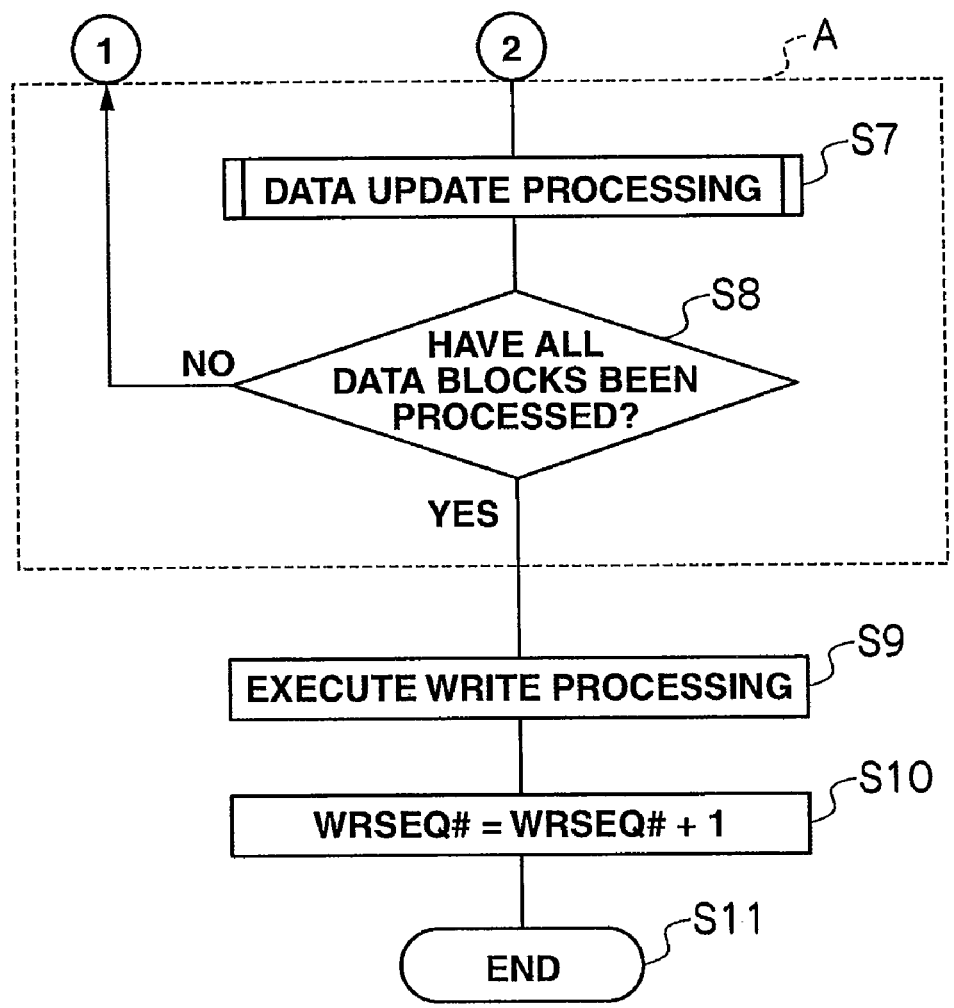
FIG. 13 is a flowchart illustrating the write sequence numbering processing according to the first embodiment.

Specifically as shown in FIGS. 12 and 13, after detecting a data write request and reading the write data from the cache memory 9, the microprocessor 100 for the disk adapter 10 starts the write sequence numbering processing (S0).

The microprocessor 100 for the disk adapter 10 judges whether an arbitrary data block DB in the received write data is the first data block DB or not (S1). If the microprocessor 100 determines that it is the first data block DB (S1: YES), it adds the position code R "10" to that data block DB, indicating that it is the top block (S2).

If the microprocessor 100 for the disk adapter 10 determines that the arbitrary data block DB in the received write data is not the first data block DB (S1: NO), it then judges whether the arbitrary data block DB is the last data block DB or not (S3). If the microprocessor 100 for the disk adapter 10 determines that the arbitrary data block is the last data block DB (S3: YES), it gives the position code "01" to that data block DB, indicating that it is the last block (S4). On the other hand, if the microprocessor 100 for the disk adapter 10 determines that the arbitrary data block is not the last data block DB, but is a middle data block DB (S3: NO), it gives the position code "00" to that data block DB, indicating that it is a middle block (S5).

After giving the position codes to the respective data blocks DB, the microprocessor 100 for the disk adapter 10 adds the sequence number as the write sequence number WRSEQ# to each data block DB in order to indicate that these data blocks DB constitute the data written in response to the same write request (S6).

The microprocessor 100 for the disk adapter 10 executes data update processing (described later) to write the added write sequence number WRSEQ# and block address to the local memory 101 for the disk adapter 10 and the cache memory 9, which are controlled by the hierarchical memory system; and the microprocessor 100 updates the table by counting up the generation number stored in the shared memory 7 (S7).

Subsequently, if the microprocessor 100 for the disk adapter 10 determines that the write sequence number WRSEQ# was given to all the data blocks DB (S8, S8: YES), it executes the processing for writing the data to the hard disk drive HDD (S9).

Figure 14:
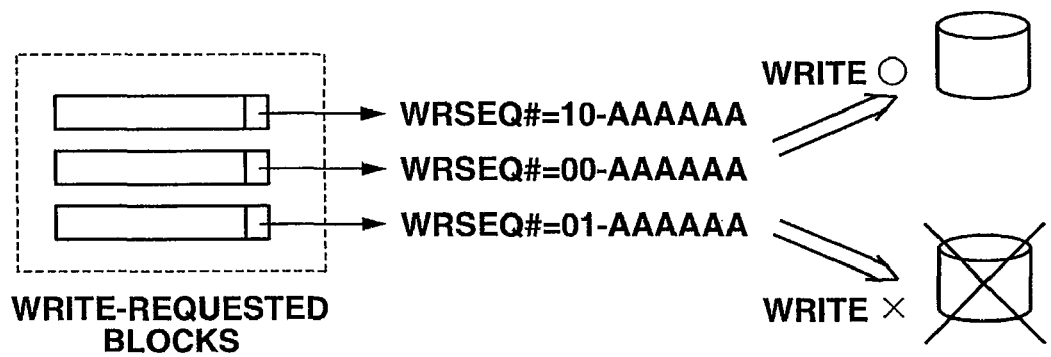
FIG. 14 is an explanatory diagram explaining the write sequence numbering processing according to the first embodiment.

If the data was successfully written to three blocks at block addresses LA "10" to "12" in the hard disk drive HDD as shown in FIG. 14, the data blocks corresponding to the block addresses LA "10" to "12" in the write sequence table 110 in the hard disk drive HDD and in the write sequence number tables 107, 900 in the local memory 101 and the cache memory 9 are updated.

On the other hand, if the data is unsuccessfully written to the three blocks at the block addresses LA "10" to "12" in the hard disk drive HDD, only the data blocks DB corresponding to the block addresses LA "10" to "12" in the write sequence number tables 107, 900 in the memory 101 and the cache memory 9 are updated. In other words, the corresponding data blocks DB in the write sequence table 110 in the hard disk drive HDD are not updated.

Subsequently, the microprocessor 100 for the disk adapter 10 increments the write sequence number WRSEQ# for the next write processing and then terminates the processing for giving the write sequence number WRSEQ# (S11).

The case where a block address LA and a parity bit value are added as other guarantee codes to each data block DB is described below.

Figure 15:
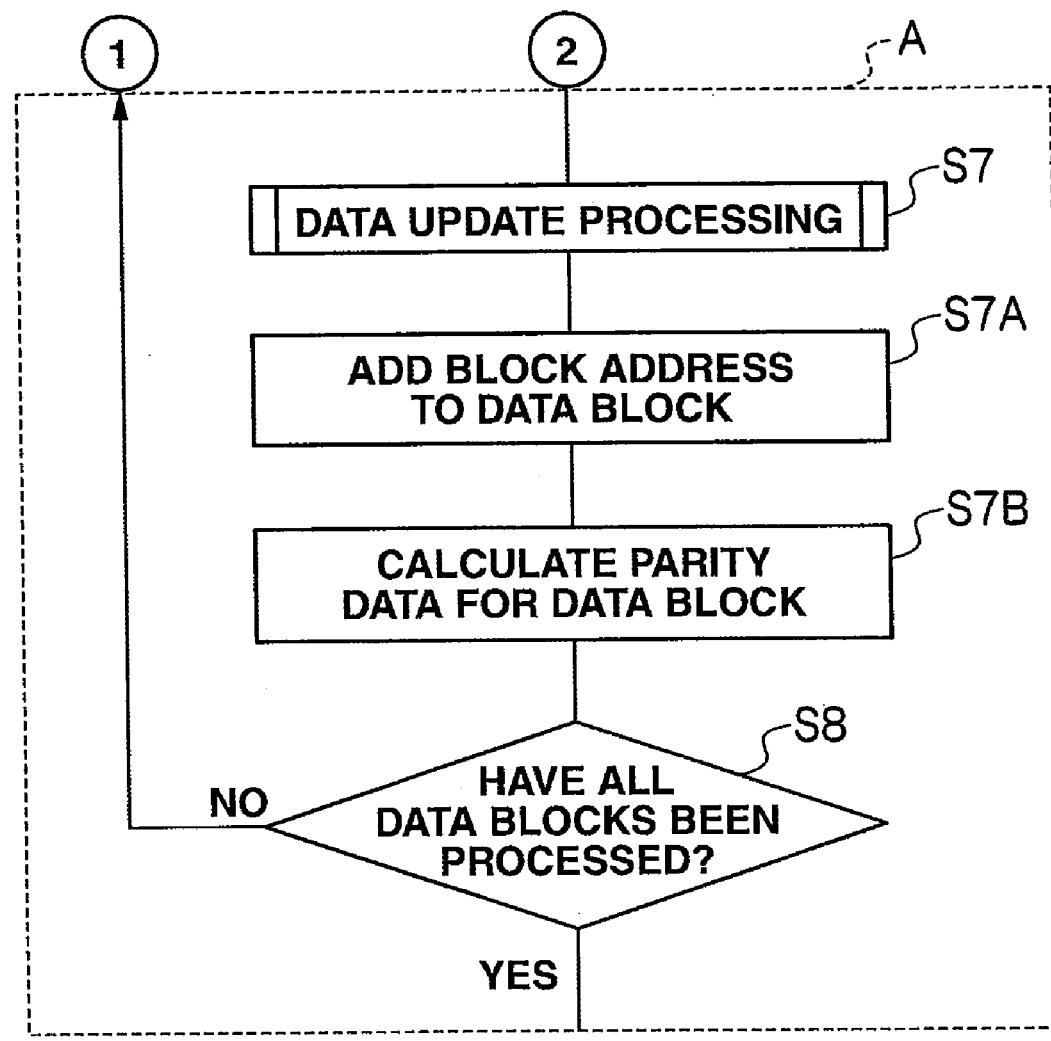
FIG. 15 is a flowchart showing part of the write sequence numbering processing according to the first embodiment.

After writing data to the local memory 101 and the cache memory 9 controlled by the hierarchical memory system and counting up the generation number stored in the shared memory 7 in order to update the table as shown in FIG. 15 (S7), the microprocessor 100 for the disk adapter 10 adds the block address LA to the data block DB (S7A), calculates a parity bit value for the data block DB, and adds the calculated parity bit value to the data block DB (S7B). Then, the microprocessor 100 executes the processing in step S8.

(1-3-2) Data Update Processing

Next, data update processing will be explained. The data update processing is also executed by the microprocessor 100 for the disk adapter 10 in accordance with a write sequence number saving program 105.

Figure 16:
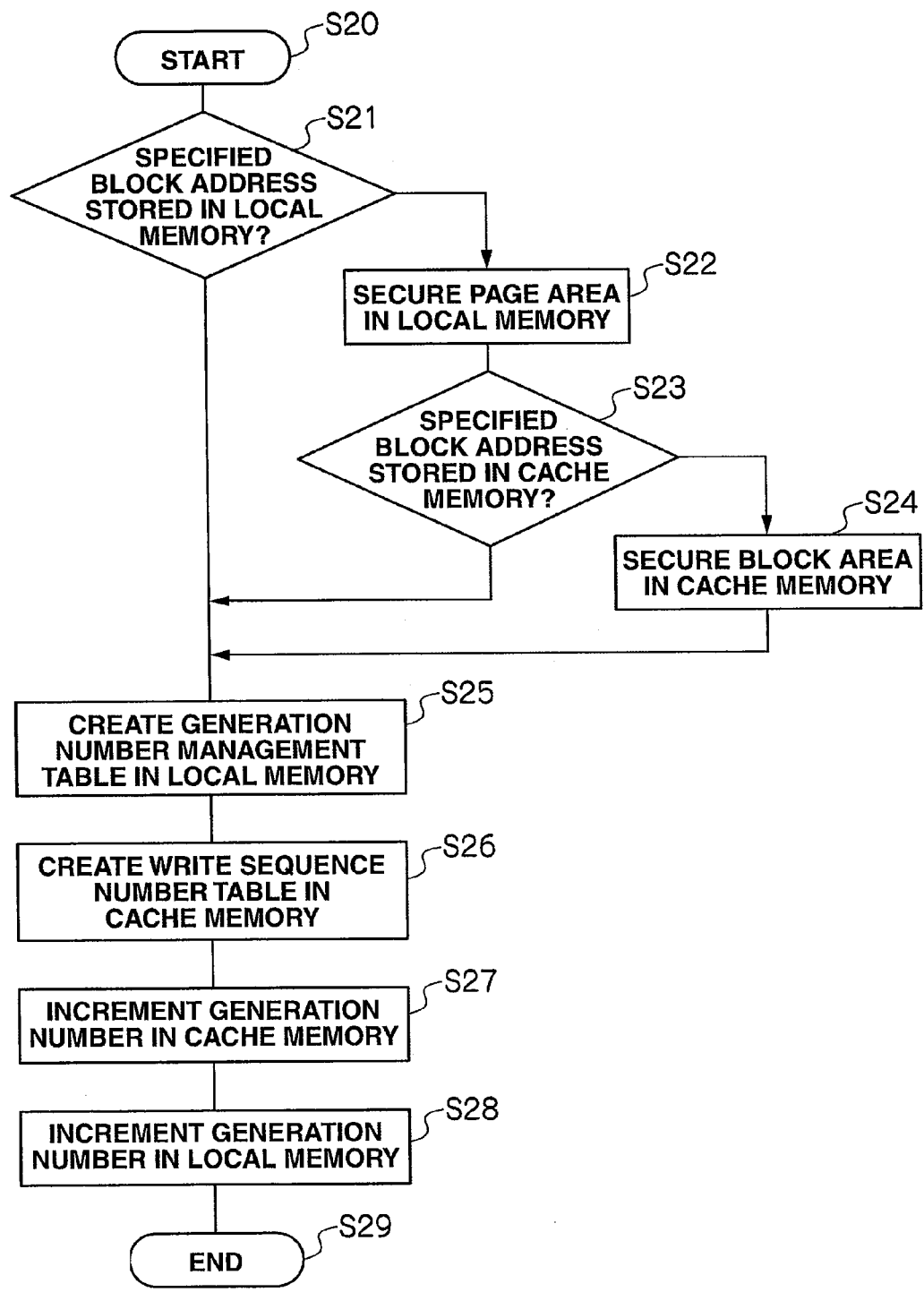
FIG. 16 is a flowchart illustrating data update processing according to the first embodiment.

Specifically as shown in FIG. 16, after adding the write sequence number WRSEQ# to the data blocks DB (S6), the microprocessor 100 for the disk adapter 10 starts the data update processing (S20).

The microprocessor 100 for the disk adapter 10 judges whether or not the write sequence number information A for the block address LA in the hard disk drive HDD, at which the data requested by the host computer 2 is stored, is stored in the local memory 101 for the disk adapter 10 (S21). If the microprocessor 100 determines that the write sequence number information A for the block address LA is not stored in the local memory 101 (S21: NO), the microprocessor 100 secures enough page areas to store the write sequence number information A in the local memory 101 (S22).

The microprocessor 100 for the disk adapter 10 then judges whether or not the write sequence number information A for the block address LA in the hard disk drive HDD, at which the data requested by the host computer 2 is stored, is stored in the cache memory 9 (S23). If the microprocessor 100 determines that the write sequence number information A for the block address LA is not stored in the cache memory 9 (S23: NO), the microprocessor 100 secures enough block areas to store the write sequence number information A in the cache memory 9 (S24).

If the microprocessor 100 for the disk adapter 10 determines that the write sequence number information A for the block address LA requested by the host computer 2 is stored in the local memory 101 or the cache memory 9 (YES in S21; or YES in S23), or if the microprocessor 100 secures enough block areas to store the write sequence number information A in the cache memory 9 (S24), it updates the generation number management table 108 in the local memory 101 in order to store the block addresses LA in the hard disk drive HDD and the generation number of the relevant data blocks DB (S25).

The microprocessor 100 for the disk adapter 10 updates the write sequence number table 700 in the cache memory 9 in order to store the block addresses LA in the hard disk drive HDD and the most recent write sequence number (S26).

Subsequently, the microprocessor 100 for the disk adapter 10 increments the generation number in the shared memory 7 (S27) and also increments the generation number in the local memory 101 (S28), and then terminates the data update processing (S29).

Figure 17:
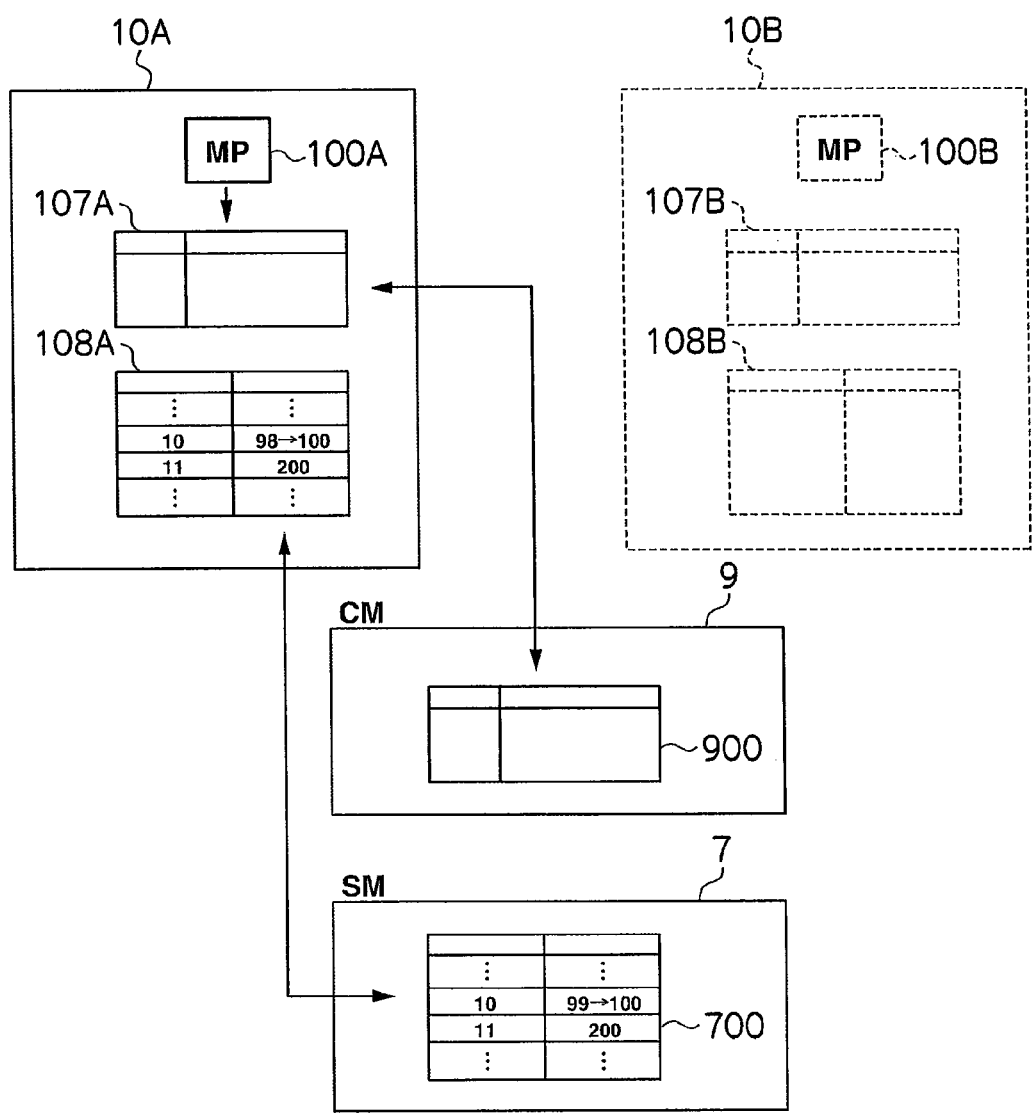
FIG. 17 is an explanatory diagram explaining the data update processing according to the first embodiment.

If the generation number in the local memory 101 does not match the generation number in the shared memory 7 as shown in FIG. 17, the microprocessor 100 for the disk adapter 10 stores the most recent write sequence number in the table 900 in the cache memory 9 and then increments the generation numbers managed by the local memory 101 and the shared memory 7 respectively so that the generation number in the local memory 101 matches the generation number in the shared memory 7.

(1-4) Reading Data (1-4-1) Write Sequence Number Check Processing

Write sequence number check processing executed when reading data from the hard disk drive HDD, using the aforementioned hierarchical memory control system, will be described below. The write sequence number check processing is processing for verifying the consistency in data when the disk adapter 10 reads the relevant data block groups from the hard disk drive HDD. The write sequence number check processing is executed by the microprocessor 100 for the disk adapter 10 in accordance with a write sequence number check program 106. Incidentally, the write sequence number check processing may be executed by the microprocessor 60 for the channel adapter 6.

Since the write sequence number check processing is executed when reading data, data reading processing will be explained first.

Upon receiving a read request from the host computer 2, the channel adapter 6 starts the data read processing. When the channel adapter 6 sends the read request to the disk adapter 10, the disk adapter 10 receives the read request.

Subsequently, the disk adapter 10 reads the relevant data from the hard disk drive HDD and writes it to the cache memory 9. Then the disk adapter 10 notifies the channel adapter 6 of the completion of writing the read data to the cache memory 9.

The channel adapter 6 receives the read data from the cache memory 9 and sends it to the host computer 2.

During this read processing, the write sequence number check processing is executed when the disk adapter 10 reads the data or the channel adapter 6 reads the data from the cache memory 9.

Figure 18:
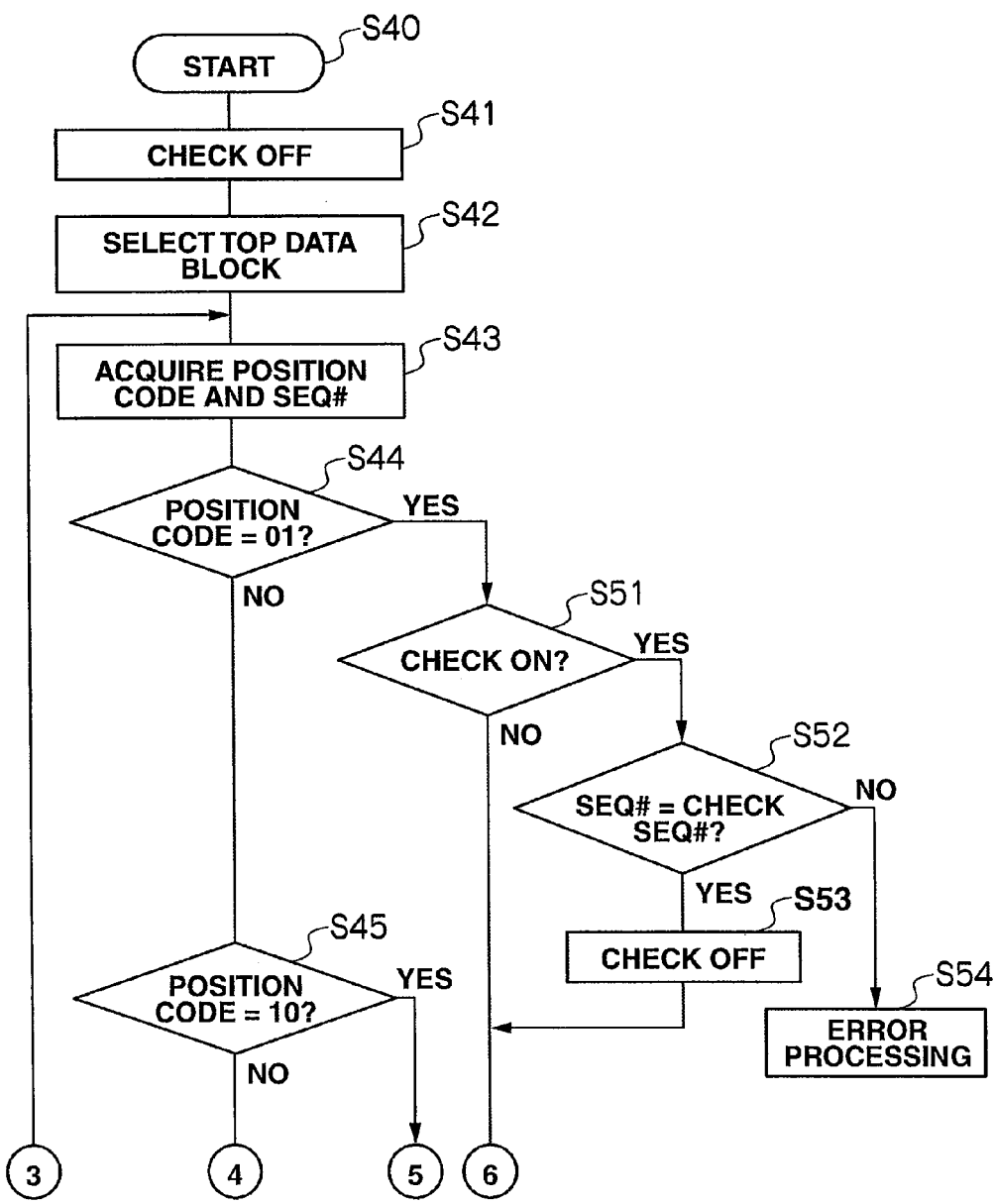
FIG. 18 is a flowchart illustrating write sequence number check processing according to the first embodiment.
Figure 19:
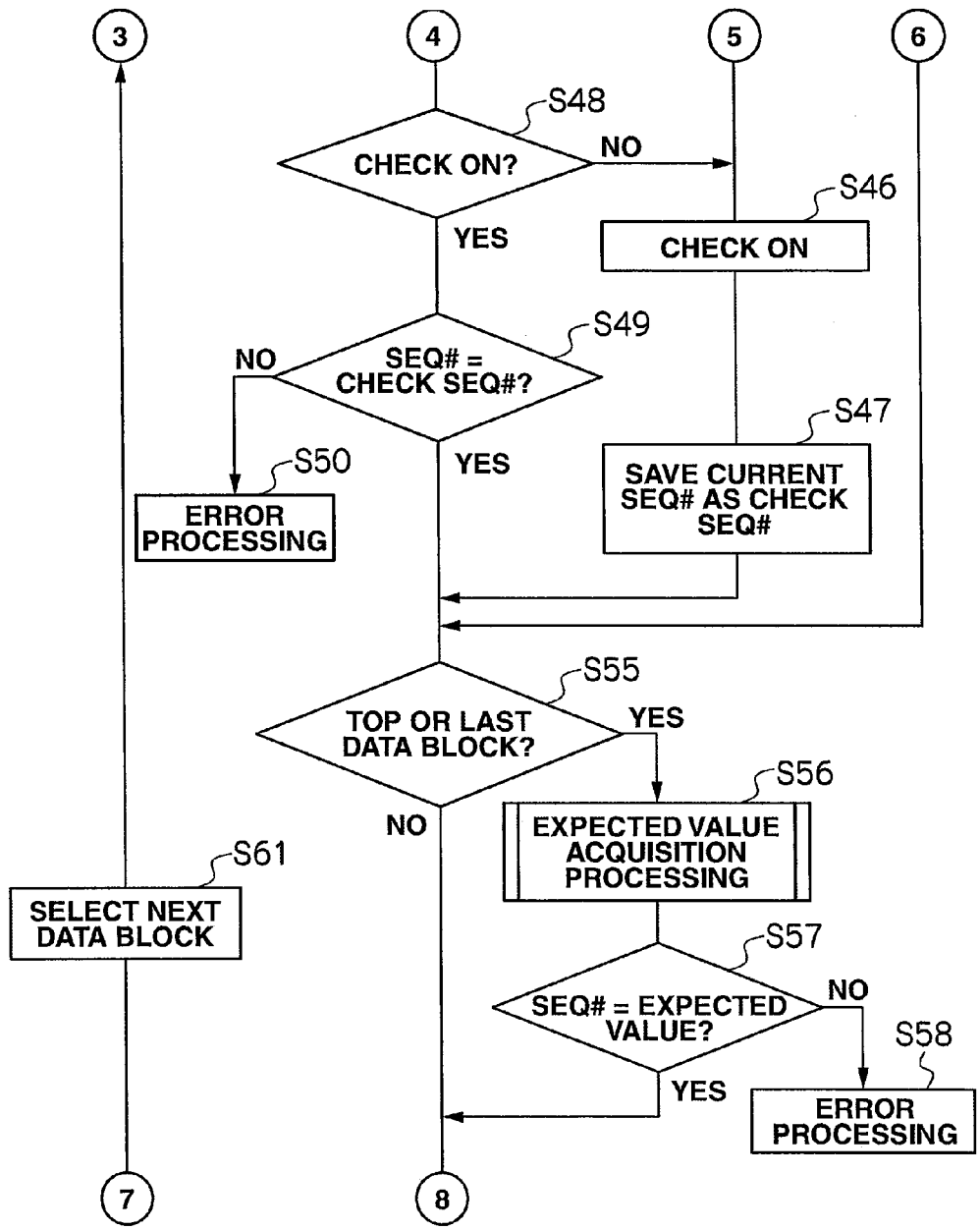
FIG. 19 is a flowchart illustrating the write sequence number check processing according to the first embodiment.
Figure 20:
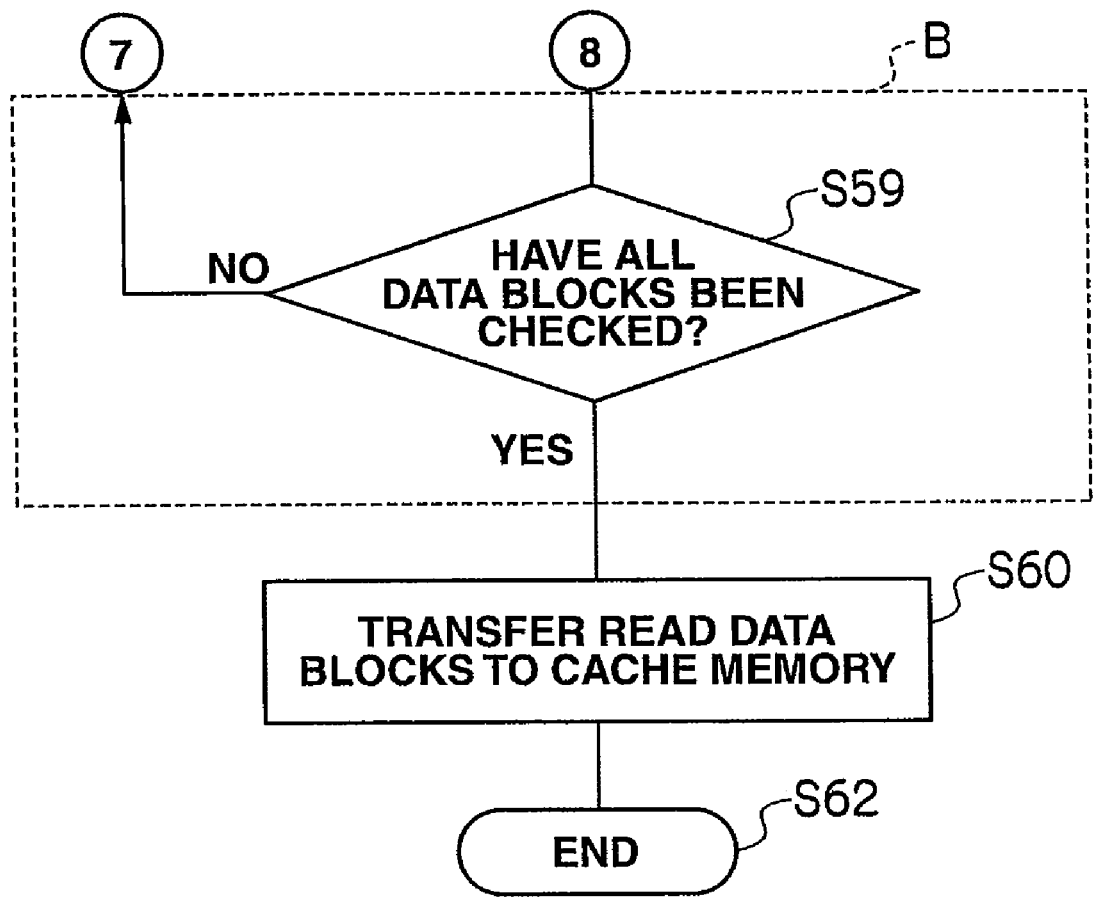
FIG. 20 is a flowchart illustrating the write sequence number check processing according to the first embodiment.

Specifically as shown in FIGS. 18-20, upon receiving the read request from the host computer 2, the microprocessor 100 for the disk adapter 10 starts the write sequence number check processing (S40).

The microprocessor 100 for the disk adapter 10 first turns off the check, i.e., checking match between the write sequence numbers WRSEQ# (S41). While the check is off, the microprocessor 100 selects the top data block from data block groups of the data read from the hard disk drive HDD (S42) and acquires the position code R and the sequence number SEQ# of that data block DB (S43).

After terminating the processing for checking the position code R, the microprocessor 100 for the disk adapter 10 judges whether or not the position code R of the arbitrary data block DB is the last code "01" (S44).

If the microprocessor 100 for the disk adapter 10 determines that the position code R of the arbitrary data block DB is not the last code "01" (S44: NO), it then judges whether or not the position code R of the data block is the top code "10" (S45).

If the microprocessor 100 for the disk adapter 10 determines that the position code of the arbitrary data block DB is the top code "10" (S45: YES), it refers to the check table 104 and turns the check on for the next loop processing (S46), and saves the current sequence number SEQ# as a checking sequence number SEQ# (S47).

Figure 21:
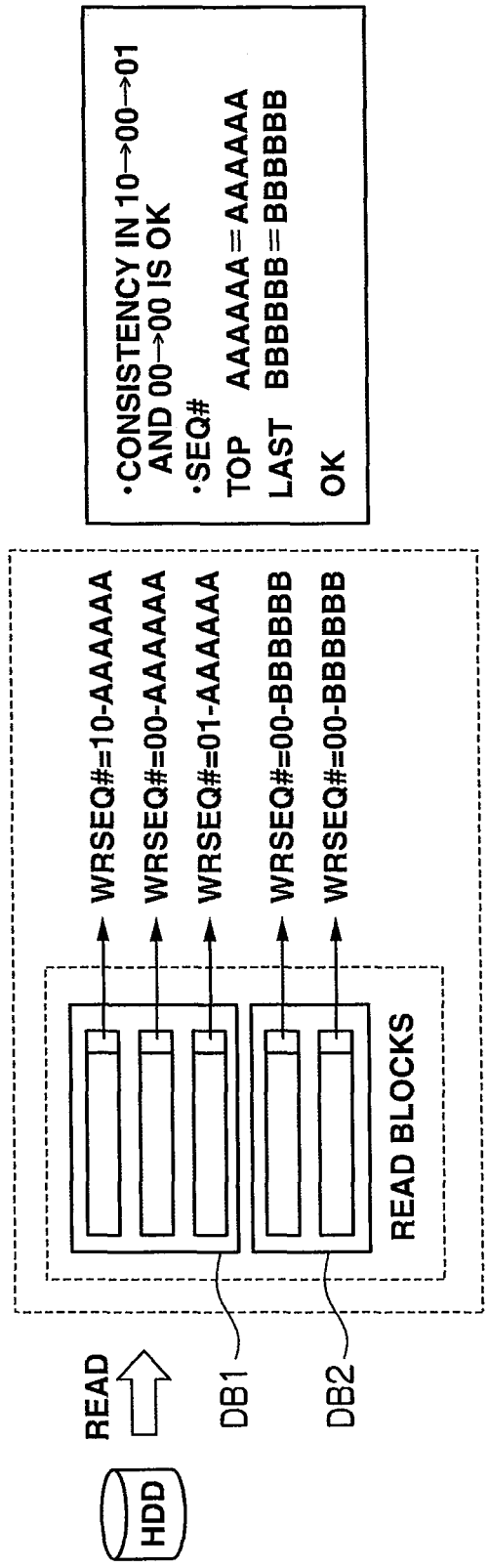
FIG. 21 is an explanatory diagram explaining the write sequence number check processing according to the first embodiment.

The term "checking sequence number SEQ#" herein used means the sequence number SEQ# of the first data block DB in a data block group having the same sequence number SEQ#. As shown in FIG. 21, in a data block group DB1 where the position codes of the data block group are arranged from the top code "10", then the middle code "00", and to the last code "01," the checking sequence number SEQ# is the sequence number "AAAAAA" of the data block DB with the top code "10." On the other hand, if a data block group DB2 consists of data blocks with only the middle code "00" and the sequence number SEQ# "BBBBBB," the checking sequence number SEQ# is the sequence number "BBBBBB" of the data block with the middle code "00" that was read first.

If the microprocessor 100 for the disk adapter 10 determines that the position code R of the arbitrary data block DB is not the top block code "10," but the middle block code "00" (S45: NO), it then judges whether the check is on or not (S48). If the microprocessor 100 for the disk adapter 10 determines that the check is off for the arbitrary data block DB (S48: NO), it turns on the check for the next loop processing (S46) and saves the current sequence number SEQ# as the checking sequence number SEQ# (S47).

If the microprocessor 100 for the disk adapter 10 determines that the check is on for the arbitrary data block DB (S48: YES), it judges whether the sequence number SEQ# of the arbitrary data block DB matches the checking sequence number SEQ# or not (S49). If the microprocessor 100 determines that the sequence number SEQ# of the arbitrary data block DB matches the checking sequence number SEQ# (S49: YES), the processing proceeds to step S55.

If the microprocessor 100 for the disk adapter 10 determines that the sequence number SEQ# of the arbitrary data block DB does not match the checking sequence number SEQ# (S49: NO), it executes error processing (S50).

Meanwhile, if the microprocessor 100 for the disk adapter 10 determines in step S44 that the position code R of the arbitrary data block DB is "01" (S44: YES), it then judges whether the check should be turned on or not for the arbitrary data block DB (S51). If the microprocessor 100 for the disk adapter 10 determines that the check should be turned on for the arbitrary data block DB with the position code R "01" (S51: YES), it then judges whether the current sequence number SEQ# matches the checking sequence number SEQ# or not (S52).

If the microprocessor 100 for the disk adapter 10 determines that the current sequence number SEQ# matches the checking sequence number SEQ# (S52: YES), it turns off the check for the arbitrary data block DB and proceeds to step S55. On the other hand, if the microprocessor 100 for the disk adapter 10 determines that the current sequence number SEQ# does not match the checking sequence number SEQ# (S52: NO), it executes the error processing due to data inconsistency (S54).

If the microprocessor 100 for the disk adapter 10 determines in step S51 that the check should not be turned on for the arbitrary data block DB with the position code R "01" (S51: NO), it is unnecessary to verify the consistency in the last data block and, therefore, the processing proceeds to step S55.

The microprocessor 100 for the disk adapter 10 judges whether the arbitrary data block DB is the top or last data block DB or not (S55). If the microprocessor 100 determines that the arbitrary data block DB is a middle data block DB in the read data (S55: NO), the processing proceeds to step S59.

On the other hand, if the microprocessor 100 for the disk adapter 10 determines that the arbitrary data block DB is the top or last data block DB in the read data (S55: YES), it acquires the expected value corresponding to the top or last data block DB from the write sequence number table 107 in the local memory 101 (S56). The term "expected value" used herein means the most recent sequence number SEQ# that is stored in the write sequence number table 107 in response to the write request from the host computer 2 and should be stored as the most recent sequence number SEQ# in the hard disk drive HDD. The expected value acquisition processing in step S56 will be described later.

The microprocessor 100 for the disk adapter 10 then judges whether the sequence number SEQ# of the top or last data block DB matches the expected value or not (S57). If the microprocessor determines that the sequence number SEQ# of the top or last data block DB matches the expected value (S57: YES), it determines that the top or last data block DB was successfully written to and read from the hard disk drive HDD.

A case where data successfully written to five blocks at the block addresses LA "10" to "14" in the hard disk drive HDD is detected when reading the data as shown in FIG. 21 will be described below. The position code R is first verified to see whether data block groups are arranged in the correct order. Consequently, it is found that the read data is composed of a data block group DB1 with the position codes R "10," "00," and "01," and a data block group DB2 with the position codes R "00" and "00." Since the first data block group DB1 is arranged first with the position code R "10," then the position code R "00," and finally the position code R "01," it can be understood that the data blocks in the data block group DB1 are correctly arranged. Next, in the second data block group DB2, whether the sequence numbers SEQ# of the read top block and the read last block match their respective expected values is verified. As a result, it is found that the sequence number SEQ# of the read top block matches its expected value "AAAAAA," and the sequence number SEQ# of the read last block matches its expected value "BBBBBB." As described above, it is possible to verify, when reading data, that the relevant data was successfully written to the hard disk drive.

Figure 22:
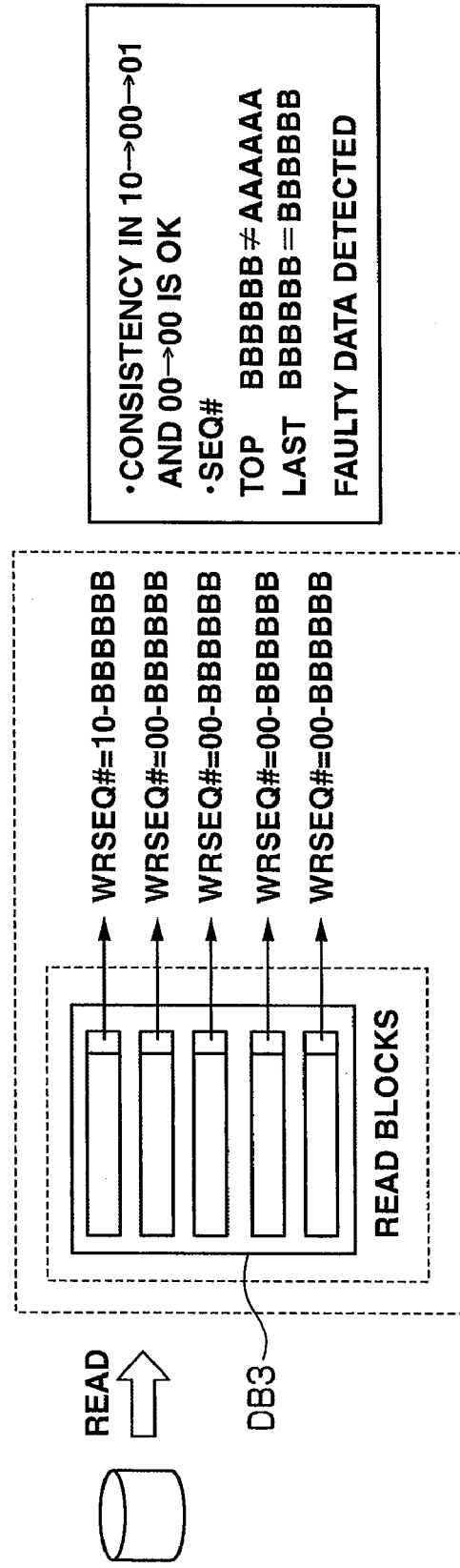
FIG. 22 is an explanatory diagram explaining the write sequence number check processing according to the first embodiment.

On the other hand, the case where data unsuccessfully written to five blocks at the block addresses LA "10" to "14" in the hard disk drive HDD is detected when reading the data as shown in FIG. 22 will be described below. The position code R is first verified to see whether the data block groups are arranged in the correct order. Consequently, it is found that the read data is composed of a data block group DB3 with the position codes R "10" and "00." Since the data block group DB3 is arranged first with the position code R "10" and then the position code R "00," it can be understood that the data blocks in the data block group DB3 are correctly arranged. Next, whether the sequence numbers SEQ# of the read top block and the read last block match their respective expected values is verified. As a result, it is found that the sequence number SEQ# of the read last block matches its expected value "BBBBBB," but the sequence number SEQ# of the read top block is "BBBBBB" and, therefore, does not match its expected value "AAAAAA." Therefore, it is possible to verify, when reading data, that the hard disk drive HDD failed to receive the write request and the data including the top block was written to the hard disk drive unsuccessfully.

If the top data block DB or the last data block DB does not match its expected value as described above (S57: NO), the error processing is executed (S58).

The microprocessor 100 for the disk adapter 10 then judges whether the consistency of all the data blocks DB has been verified or not (S59). If the microprocessor 100 determines that the consistency of all the data blocks DB of the read data has been verified (S59: YES), it transfers the read data to the cache memory 9 (S60) and terminates the write sequence number WRSEQ# check processing (S62).

On the other hand, if the microprocessor 100 for the disk adapter 10 determines that the consistency of not all the data blocks DB of the read data has been verified (S59: NO), the microprocessor 100 selects the next data block DB (S61) and then returns to step S43 to verify the data consistency in the next data block DB. As described above, the write sequence number check processing is executed to check the write sequence number of the data block groups of the read data from the top data block to the last data block in order.

The case where the block address LA and the parity bit value are added as guarantee codes to data when writing the data will be described below.

Figure 23:
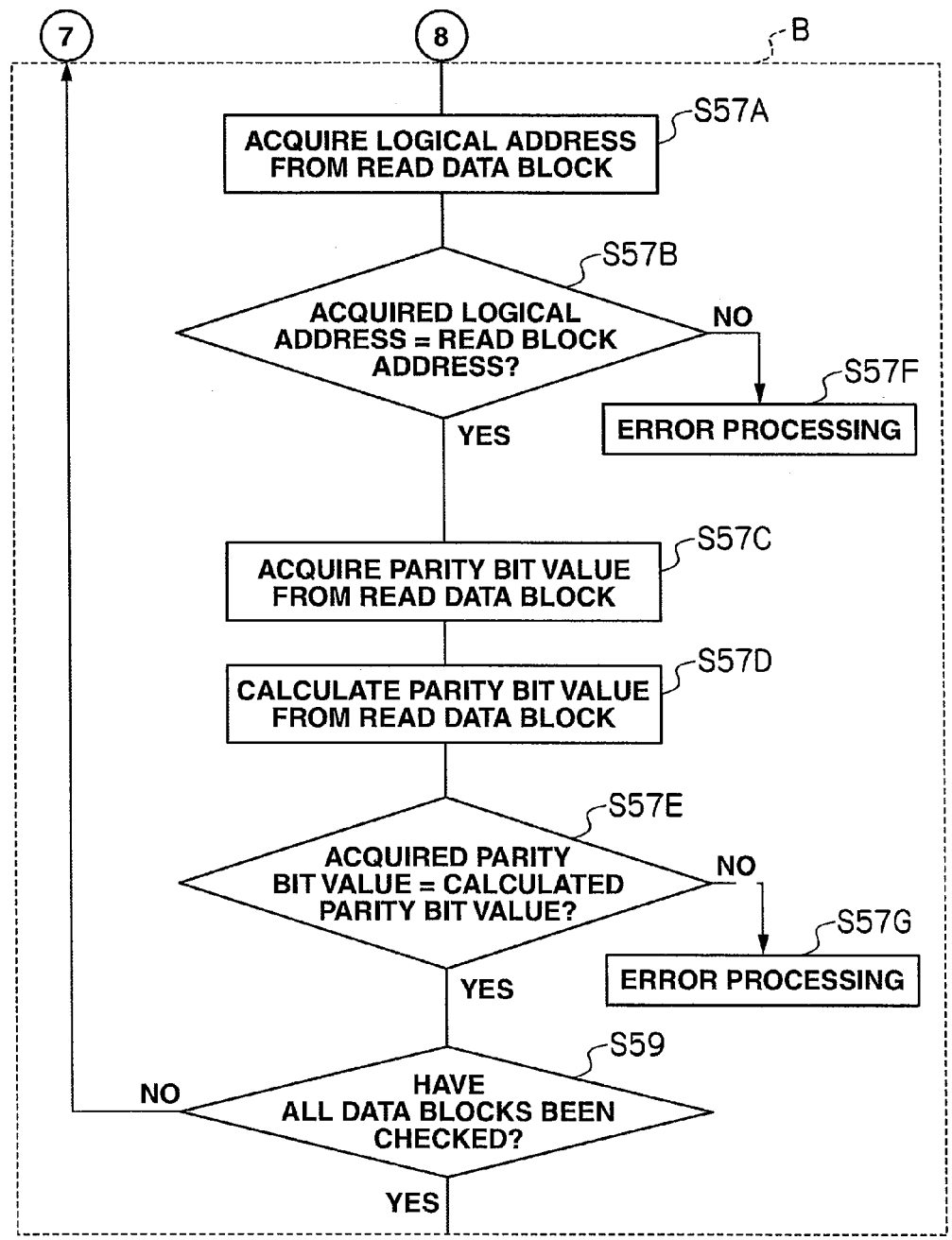
FIG. 23 is a flowchart illustrating part of the write sequence number check processing according to the first embodiment.

As shown in FIG. 23, after executing the processing in step S55 or S57, the microprocessor 100 for the disk adapter 10 acquires the block address LA added to the relevant read data block DB (S57A). The microprocessor 100 for the disk adapter 10 then judges whether the block address LA added to the data block DB matches the block address LA in the hard disk drive HDD from which the data block DB was read (S57B). If the block address LA added to the data block DB matches the block address LA in the hard disk drive HDD (S57B: YES), the microprocessor 100 then acquires the parity bit value added to the data block DB (S57C). Subsequently, the microprocessor 100 for the disk adapter 10 actually calculates the parity bit value based on the read data block DB (S57D). The microprocessor 100 for the disk adapter 10 judges whether the acquired parity bit value matches the calculated parity bit value or not (S57E). If the microprocessor 100 determines that the acquired parity bit value matches the calculated parity bit value (S57E: YES), it then executes the processing in step S59.

On the other hand, if the block address LA added to the data block does not match the block address LA in the hard disk drive HDD from which the data block DB was actually read (S57B), or if the acquired parity bit value does not match the calculated parity bit value (S57E), the microprocessor 100 for the disk adapter 10 executes the error processing (S57F, S57G).

(1-4-2) Expected Value Acquisition Processing

Next, expected value acquisition processing will be described. The expected value acquisition processing is the processing for acquiring the most recent sequence number WRSEQ# of read data to be sent to the host computer 2 and is executed by the microprocessor 100 for the disk adapter 10 in accordance with a write sequence number check program 106.

Figure 24:
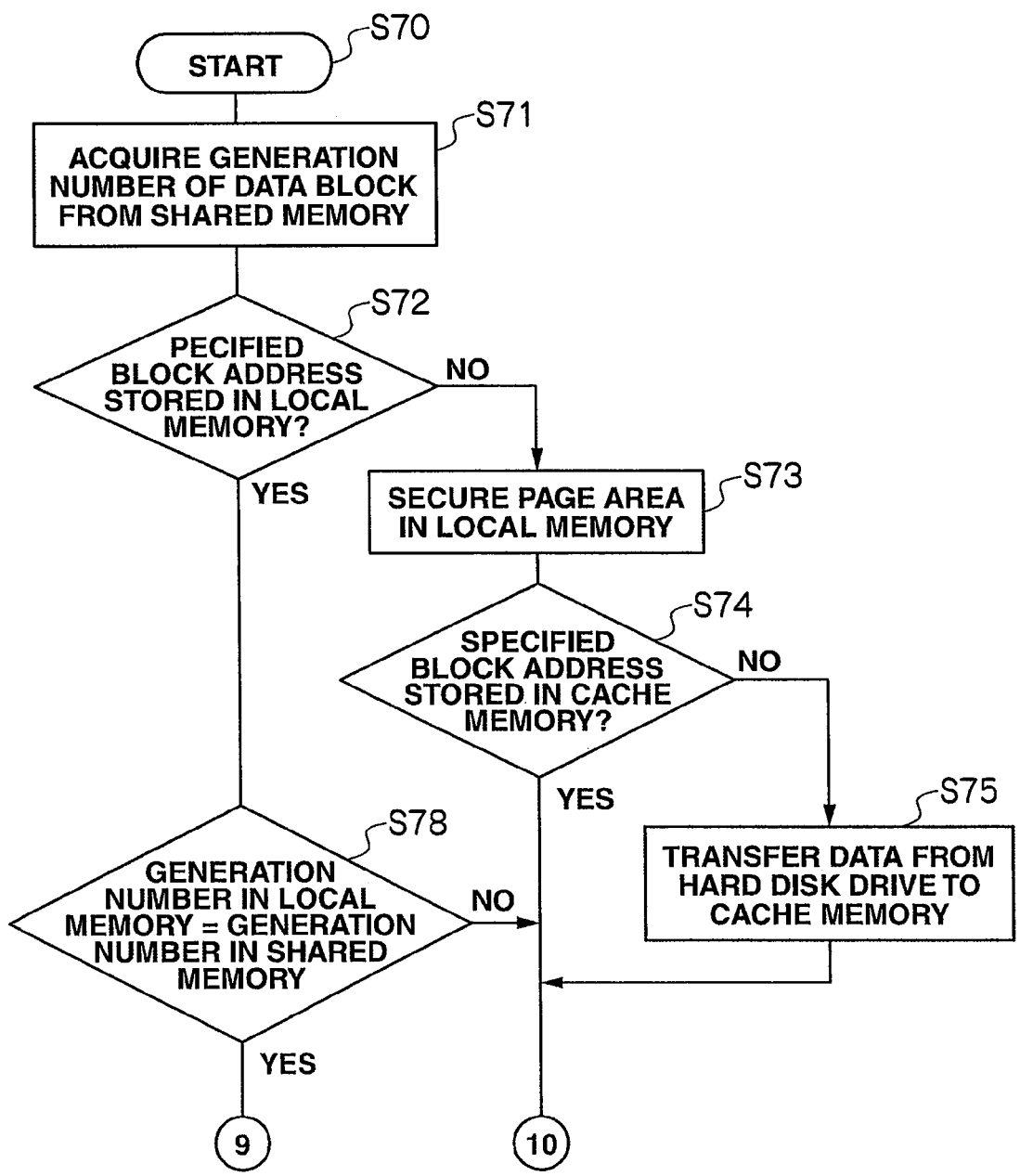
FIG. 24 is a flowchart illustrating the write sequence number check processing according to the first embodiment.
Figure 25:
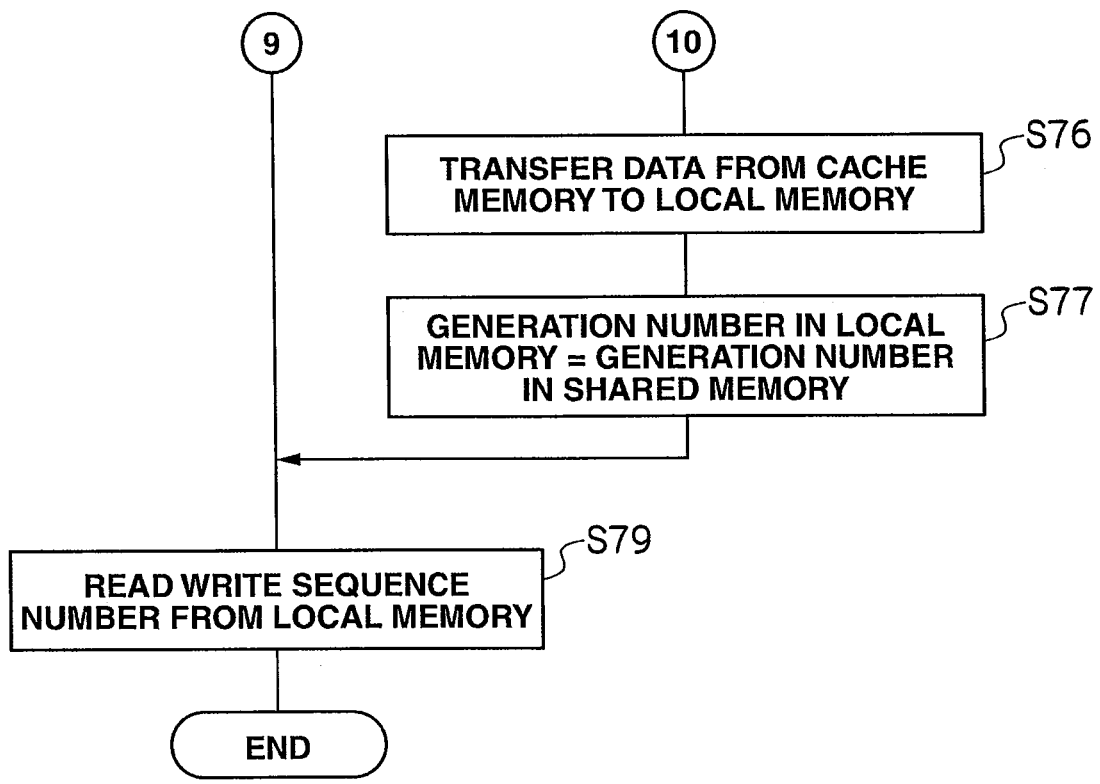
FIG. 25 is a flowchart illustrating the write sequence number check processing according to the first embodiment.

Specifically as shown in FIGS. 24 and 25, if the microprocessor 100 for the disk adapter 10 determines that the arbitrary data block DB is the top or last data block DB (S55: YES), it starts the expected value acquisition processing (S70).

The microprocessor 100 for the disk adapter 10 acquires the most recent generation number of the arbitrary data block DB from the shared memory 7 (S71).

The microprocessor 100 for the disk adapter 10 judges whether or not the block address LA, at which the arbitrary data block DB is stored, is stored in the write sequence number table 107 in the local memory 101 (S72). If the microprocessor 100 determines that the block address LA, at which the data block DB is stored, is not stored in the table 107 (S72: NO), it secures sufficient page areas in the local memory 101 to read the arbitrary data block DB (S73).

Subsequently, the microprocessor 100 for the disk adapter 10 judges whether or not the block address LA, at which the arbitrary data block DB is stored, is stored in the write sequence number table 900 in the cache memory 9 (S74). If the block address LA, at which the arbitrary data block DB is stored, is not stored in the write sequence number table 900 in the cache memory 9 (S74: NO), the microprocessor 100 reads the requested data including the arbitrary data block DB from the hard disk drive HDD and transfers it to the cache memory 9 (S75).

After receiving the read data, the microprocessor 100 for the disk adapter 10 transfers the read data to the local memory 101 (S76) and changes the generation number in the local memory 101 corresponding to the read data so that it becomes identical to the generation number in the shared memory 7 (S77).

On the other hand, if the microprocessor 100 for the disk adapter 10 determines in step S72 that the data address LA, at which the relevant data block DB is stored, is stored in the write sequence number table 107 in the local memory 101 (S72: YES), the microprocessor 100 judges whether or not the generation number in the local memory 101 corresponding to the arbitrary data block DB matches the generation number in the shared memory 7 (S78).

If the microprocessor 100 for the disk adapter 10 determines that the generation number in the local memory 101 does not match the generation number in the shared memory 7 (S78: NO), it executes the processing in step S76 and step S77 so that the generation number in the local memory 101 becomes identical to the generation number in the shared memory 7.

After making the generation number in the local memory 101 identical to the generation number in the shared memory 7, the microprocessor 100 for the disk adapter 10 reads, as the expected value, the write sequence number SEQ# of the arbitrary data block DB from the local memory 61 (S79) and terminates the expected value acquisition processing (S80).

After acquiring the sequence number, which is the expected value, from the most recent write sequence number WRSEQ# of the read data to be sent to the host computer 2 as described above, the microprocessor 100 for the disk adapter 10 executes the processing in step S56.

(1-5) Advantageous Effects of First Embodiment

Even if the hard disk drive failed to receive a write request itself, the fault in receiving the write request itself can be detected according to the first embodiment without detecting non-updated old data stored in the hard disk drive and verifying errors in the data. Therefore, data sent and received by the host computer can be guaranteed.

(2) Second Embodiment (2-1) System Configuration

Next, a storage system 100 according to the second embodiment will be explained. The components in the second embodiment the same as those used in the first embodiment are given the same reference numerals as in the first embodiment. Only the parts of the configuration of the second embodiment that is different from the first embodiment will be explained below.

Figure 26:
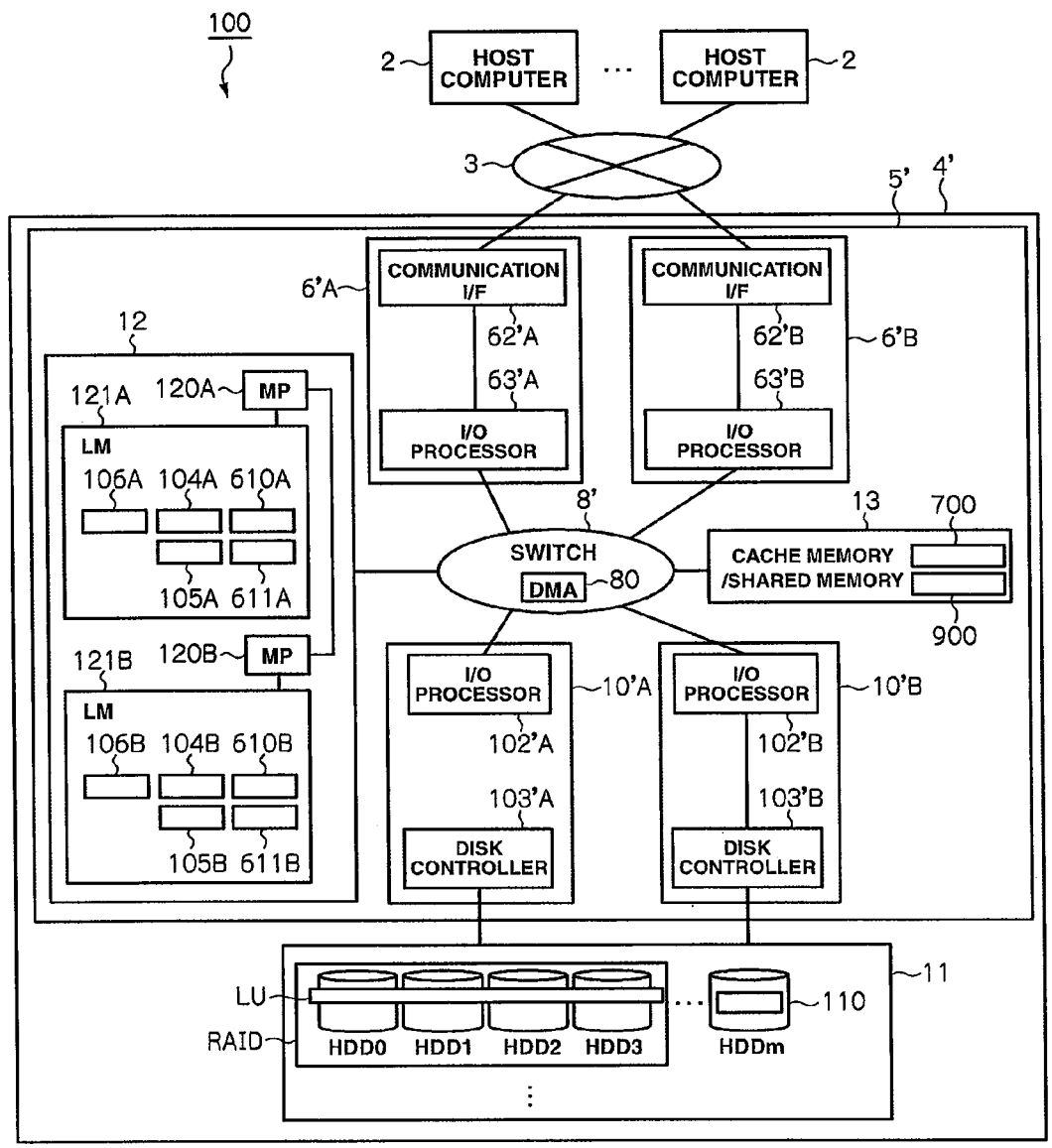
FIG. 26 is a block diagram of the entire storage system according to a second embodiment of the present invention.

Reference numeral "100" in FIG. 26 represents a storage system according to the present invention. This storage system 100 is configured so that host computers 2 are connected via a network 3 to a storage apparatus 4'.

The storage apparatus 4' includes a controller unit 5 for controlling data input to and output from the host computers 2; and a hard disk drive unit 11 for storing data from the host computers 2.

The controller unit 5' is configured so that channel adapters 6', a processor unit 12, a memory unit 13, and disk adapters 10' are connected via a switch 8'.

The switch 8' according to the second embodiment is equipped with a DMA (Direct Memory Access) 80. After receiving an instruction from the processor unit 12, the DMA 80 directly (not via the processor unit 12) transfers data between the channel adapters 6', the memory unit 13, and the disk adapters 10'.

While the microprocessors 60, 100 and the local memory 61, 101 are contained in the channel adapters 6 and the disk adapters 10 according to the first embodiment, they are configured independently as microprocessors 120 and local memory 121 for the processor unit 12 according to the second embodiment.

The local memory 121 for the processor unit 12 stores various tables 610, 611, 104 and programs 105, 106 stored in the respective local memory 61, 101 for the channel adapters 6 and the disk adapters 10 according to the first embodiment.

The shared memory 7 and the cache memory 9 in the first embodiment are configured independently as a memory unit 13 in the second embodiment. Therefore, the memory unit 13 stores various tables 700, 900 stored in the shared memory 7 and the cache memory 9 according to the first embodiment.

(2-2) Generation Number Management System

When the channel adapter 6' receives a write request from the host computer 2 and subsequently writes the relevant data to the hard disk drive HDD, the disk adapter 10' gives the write sequence number WRSEQ# to the data according to the second embodiment. As a result, the DMA 80 updates the write sequence number WRSEQ# and the generation number in the write sequence number table 900 and the generation number management table 700 in the memory unit 13 all at once. At the same time, the DMA 80 also updates the generation number in the generation number management table 611 in the local memory 121.

Similarly, after the channel adapter 6' receives a read request from the host computer 2, the DMA 80 directly accesses the memory unit 13 and acquires the most recent generation number from the generation number management table 700. If the generation number managed by the memory unit 13 does not match the generation number managed by the local memory, the DMA 80 directly reads the most recent write sequence number WRSEQ# and generation number in the memory unit 13 and updates the tables 610, 611 in the local memory 121.

As described above, the DMA 80 executes actual data transfers and table updates in accordance with instructions from the microprocessor 120. The microprocessor 120 executes various kinds of processing explained in the first embodiment, except the actual data transfers and table updates.

(2-3) Advantageous Effects of Second Embodiment

Even if the hard disk drive failed to receive an actual write request, the fault in receiving the write request itself can be detected according to the second embodiment without detecting non-updated old data stored in the hard disk drive and verifying errors in the data. Therefore, data sent and received by the host computer can be guaranteed as the most recent and error-free.

Also, since the DMA executes the actual data transfers and table updates in accordance with instructions from the microprocessor, the number of times the memory is accessed can be reduced. As a result, the processing for generation number management and updates can be executed at high speed.

What is claimed is:

1. A storage apparatus comprising:
a controller unit that has a memory unit for temporarily storing data sent from a host computer in response to an arbitrary write request from the host computer and that controls input and output of the data; and
a hard disk drive unit that is connected to the controller unit and stores the data;
wherein the controller unit performs the following:
giving each data block, which is a data constituent unit, an identification number indicating that the relevant data has been sent from the host computer in response to the arbitrary write request from the host computer;
storing, in the memory unit, a storage location in the hard disk drive unit to store the data, as well as the identification number, as an expected value, for the data to be stored in the hard disk drive unit; and
in response to a read request from the host computer, comparing the identification number given to each data block, the constituent unit of the data read from the hard disk drive unit, with the expected value of the read data, thereby verifying that the read data is the data that was written to the hard disk drive in response to the arbitrary write request,
wherein the identification number given to each data block is composed of a position code indicating that the relevant data block is the top block, a middle block, or the last block of data sent from the host computer in response to one write request from the host computer; and an identifier indicating that the relevant data has been sent from the host computer in response to one write request from the host computer; and wherein the controller unit executes the following:
verifying a sequence of the position code in a data block group that constitutes the read data; and
comparing the identifier of the data block group with the expected value for the read data, thereby verifying that the read data is the data that was written in response to the arbitrary write request,
wherein the memory unit is configured so that local memory units are respectively connected to cache memory and shared memory; and
the memory unit performs the following:
storing the identification number of a data block group accessed by the host computer, from among a plurality of data block groups constituting the data, as write sequence number information, in an arbitrary local memory unit and the cache memory; and
storing a generation number for managing the number of times the write sequence number information from among the data is updated, in the arbitrary local memory unit and the shared memory; and
wherein the controller unit performs the following:
acquiring, from the shared memory, the most recent generation number of the write sequence number information constituting the read data;
searching the arbitrary local memory unit or the cache memory for the write sequence number corresponding to the most recent generation number; and
if the write sequence number corresponding to the most recent generation number does not exist in the arbitrary local memory unit, changing the generation number managed by the arbitrary local memory unit to become identical to the most recent generation number managed by the shared memory, and then setting the identifier stored in the arbitrary local memory unit as the expected value.

2. The storage apparatus according to claim 1, wherein the controller unit performs the following:
searching the arbitrary local memory unit or the cache memory for the write sequence number information corresponding to the most recent generation number; and
if the write sequence number information corresponding to the most recent generation number is not stored in either the arbitrary local memory unit or the cache memory, reading the write sequence number information corresponding to the most recent generation number from the hard disk drive.

3. The storage apparatus according to claim 2, wherein the memory unit manages the cache memory and the shared memory as one memory unit,
the local memory units are respectively connected via a switch unit to the cache memory and the shared memory, and
the switch unit writes and reads the data.

4. A data verification method for a storage apparatus including a controller unit that has a memory unit for temporarily storing data sent from a host computer in response to an arbitrary write request from the host computer and that controls input and output of the data; and a hard disk drive unit that is connected to the controller unit and stores the data;
wherein the data verification method comprises the steps executed by the controller unit of:
giving each data block, which is a data constituent unit, an identification number indicating that the relevant data has been sent from the host computer in response to an arbitrary write request from the host computer;
storing, in the memory unit, a storage location in the hard disk drive unit to store the data, as well as the identification number, as an expected value, for the data to be stored in the hard disk drive unit; and in response to a read request from the host computer, comparing the identification number given to each data block, the constituent unit of the data read from the hard disk drive unit, with the expected value of the read data, thereby verifying that the read data is the data written to the hard disk drive in response to the arbitrary write request, wherein the identification number given to each data block is composed of: a position code indicating that the relevant data block is the top block, a middle block, or the last block of data sent from the host computer in response to one write request from the host computer; and an identifier indicating that the relevant data has been sent from the host computer in response to one write request from the host computer; and wherein the data verification method further comprises the steps executed by the controller unit of:

verifying a sequence of the position code in a data block group constituting the read data; and comparing the identifier of the data block group with the expected value for the read data, thereby verifying that the read data is the data that was written in response to the arbitrary write request, wherein the memory unit is configured so that local memory units are respectively connected to cache memory and shared memory; and the data verification method further comprises the steps executed by the memory unit of:

storing the identification number of a data block group accessed by the host computer, from among a plurality of data block groups constituting the data, as write sequence number information, in an arbitrary local memory unit and the cache memory; and storing a generation number for managing the number of times the write sequence number information from among the data is updated, in the arbitrary local memory unit and the shared memory; and wherein the data verification method further comprises the steps executed by the controller unit of:

acquiring, from the shared memory, the most recent generation number of the write sequence number information constituting the read data;

searching the arbitrary local memory unit or the cache memory for the write sequence number corresponding to the most recent generation number; and if the write sequence number corresponding to the most recent generation number does not exist in the arbitrary local memory unit, changing the generation number managed by the arbitrary local memory unit to become identical to the most recent generation number managed by the shared memory, and then setting the identifier stored in the arbitrary local memory unit as the expected value.

5. The data verification method according to claim 4, further comprising the steps executed by the controller unit of:

searching the arbitrary local memory unit or the cache memory for the write sequence number information corresponding to the most recent generation number; and if the write sequence number information corresponding to the most recent generation number is not stored in either the arbitrary local memory unit or the cache memory, reading the write sequence number information corresponding to the most recent generation number from the hard disk drive.

6. The data verification method according to claim 5, wherein the memory unit manages the cache memory and the shared memory as one memory unit, and the local memory units are respectively connected via a switch unit to the cache memory and the shared memory; and wherein the data verification method further comprises a step executed by the switch unit of writing and reading the data.

* * * * *